United States Patent
Yang et al.

(10) Patent No.: US 11,188,753 B2
(45) Date of Patent: Nov. 30, 2021

(54) METHOD OF USING A HETEROGENEOUS POSITION INFORMATION ACQUISITION MECHANISM IN AN OPERATING SPACE AND ROBOT AND CLOUD SERVER IMPLEMENTING THE SAME

(71) Applicant: LG ELECTRONICS INC., Seoul (KR)

(72) Inventors: Sookhyun Yang, Seoul (KR); Jungsik Kim, Seoul (KR); Gyuho Eoh, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 15/931,724

(22) Filed: May 14, 2020

(65) Prior Publication Data

US 2021/0089772 A1 Mar. 25, 2021

(30) Foreign Application Priority Data

Sep. 19, 2019 (KR) .................. 10-2019-0115576

(51) Int. Cl.
| | |
|---|---|
| *G06K 9/00* | (2006.01) |
| *G06T 7/11* | (2017.01) |
| *G05D 1/02* | (2020.01) |
| *G01S 19/01* | (2010.01) |
| *G06T 7/70* | (2017.01) |

(52) U.S. Cl.
CPC .......... *G06K 9/00664* (2013.01); *G01S 19/01* (2013.01); *G05D 1/0246* (2013.01); *G06T 7/11* (2017.01); *G06T 7/70* (2017.01)

(58) Field of Classification Search
CPC .................. G01S 19/01; G06T 7/70
See application file for complete search history.

(56) References Cited

U.S. PATENT DOCUMENTS

| | | | |
|---|---|---|---|
| 8,380,349 B1 * | 2/2013 | Hickman ............. | G05D 1/0246 700/250 |
| 2016/0016312 A1 * | 1/2016 | Lawrence, III .... | B23Q 17/2233 700/98 |
| 2018/0111274 A1 * | 4/2018 | Seok .................... | G05D 1/0027 |

(Continued)

OTHER PUBLICATIONS

Kendall et al.; "PoseNet: A Convolutional Network for Real-Time 6-DOF Camera Relocalization," University of Cambridge, arXiv:1505.07427v4 [cs.CV] Feb. 18, 2016, 9 pages.

(Continued)

*Primary Examiner* — Hadi Akhavannik
(74) *Attorney, Agent, or Firm* — Finnegan, Henderson, Farabow, Garrett & Dunner, LLP.

(57) ABSTRACT

A robot and/or a computer system may be used to generate position information of the robot operating in an operating space that is subdivided into a plurality of cells. The robot includes a sensor configured to acquire data related to the operating space. A memory of the robot and/or the computer server may store information regarding at least two of the cells and an indicator of a position information acquisition technique used to generate position information of the robot in a cell. The controller may be configured to acquire information related to a cell that the robot is positioned in and generate the position information of the robot based on the position information acquisition technique, the sensor data, and the cell information.

20 Claims, 13 Drawing Sheets

(56) References Cited

U.S. PATENT DOCUMENTS

| | | | | |
|---|---|---|---|---|
| 2018/0133895 A1* | 5/2018 | Kwak | .................... | H04W 4/029 |
| 2018/0165829 A1* | 6/2018 | Hong | ......................... | G06T 7/70 |
| 2019/0315270 A1* | 10/2019 | Ly | ............................ | G06T 7/70 |
| 2020/0242388 A1* | 7/2020 | Mondal | .................... | G06T 5/008 |

OTHER PUBLICATIONS

Clark et al.; "VidLoc: A Deep Spatio-Temporal Model for 6-DoF Video-Clip Relocalization," University of Oxford, Oxford OX1 3PA, University of Warwick, Coventry, CV4 7AL, arXiv:1702.06521v2 [cs.CV] Jul. 31, 2017, 9 pages.

Li et al.; "Relative Geometry-Aware Siamese Neural Network for 6DOF Camera Relocalization," arXiv: 1901.01049v2 [cs.CV] Jan. 21, 2019, 12 pages.

\* cited by examiner

METHOD OF USING A HETEROGENEOUS POSITION INFORMATION ACQUISITION MECHANISM IN AN OPERATING SPACE AND ROBOT AND CLOUD SERVER IMPLEMENTING THE SAME

CROSS-REFERENCE TO RELATED APPLICATION

Pursuant to 35 U.S.C. § 119(a), this application claims the benefit of earlier filing date and right of priority to Korean Patent Application No 10-2019-0115576, filed on Sep. 19, 2019, the contents of which are hereby incorporated by reference herein in its entirety.

BACKGROUND

Technical Field

The present disclosure relates to a method of using a heterogeneous position information acquisition mechanism in an operating space and a robot and a cloud server implementing such method.

Description of Related Art

Robots may be required to identify current positions thereof during movement in an operating space (e.g., an outdoor region that the robot operates in). Current position information of the robots may be precisely acquired during autonomous driving of the robots and performance of various operations (e.g., delivery, guidance, cleaning, and security) of the robots.

In the related art, global positioning system (GPS) may be used to acquire position information in outdoor regions. However, GPS may have low precision with regard to position, which may result in failure to perform operations of the robots.

The present disclosure describes systems and methods that may rectify at least some of the above-described deficiencies. In particular, some embodiments disclose systems and methods for acquiring precise position information of a robot in a large outdoor region. The scope of the current disclosure, however, is defined by the attached claims, and not by the ability to solve any specific problem.

SUMMARY

In some embodiments, the present disclosure provides a method for precisely acquiring, by a robot or a cloud server, position information in an operating space.

In some embodiments, the present disclosure also provides a method for dividing, by a robot or a cloud server, an operating space into cells and acquiring position information through at least one mechanism optimized for at least one cell.

In some embodiments, the present disclosure further provides a method for acquiring, by a robot or a cloud server, position information through at least one position information acquisition mechanism optimized for at least one cell of the outdoor space.

The advantages of the present disclosure are not limited to those mentioned herein. Other advantages of the present disclosure can be understood from the following description and may be more clearly understood based on the disclosed embodiments of the present disclosure. It will also be readily apparent that the advantages of the present disclosure can be implemented by features described in one or more of the claims.

In some embodiments a robot is disclosed. The robot may include a sensor, a memory, and a controller. The sensor may be configured to acquire data related to an operating space that the robot is configured to operate in. The operating space may be subdivided into a plurality of cells. The memory may be configured to store (a) two or more pieces of information regarding at least two cells of the plurality of cells and (b) a position information acquisition technique indicator for at least one cell of the at least two cells. The position information acquisition technique indicator is indicative of a position information acquisition technique used to generate position information of the robot in the at least one cell. The controller may be configured to (i) acquire cell information related to a cell of the plurality of cells that the robot is positioned in and (ii) generate the position information of the robot based on the position information acquisition technique, the data acquired by the sensor, and the acquired cell information.

In some embodiments, a computer server configured to generate position information of a robot in an operating space is disclosed. The computer server may include a communicator, memory, and a server controller. The communicator may be configured to transmit and receive data to and from at least one robot operating in the operating space. The operating space may be subdivided into a plurality of cells. The memory may be configured to store (a) two or more pieces of information regarding at least two cells of the plurality of cells, and (b) a position information acquisition technique indicator of at least one cell of the at least two cells. The position information acquisition technique indicator is indicative of a position information acquisition technique used to generate position information of the at least one robot in the at least one cell. The server controller may be configured to (i) acquire cell information related to a cell of the plurality of cells that the at least one robot is positioned in and (ii) generate the position information of the at least one robot in the operating space based on the position information acquisition technique, the data received from the at least one robot, and the acquired cell information.

In some embodiments, a method of generating position information of a robot in an operating space is disclosed. The operating space may be subdivided into a plurality of cells. The method may comprise storing, in a memory device, (a) two or more pieces of information regarding at least two cells of the plurality of cells and (b) position information acquisition technique indicator of at least one cell of the at least two cells. The position information acquisition technique indicator is indicative of a position information acquisition technique used to generate position information of the robot in the at least one cell. The method may also include acquiring, using a sensor of the robot, sensor data related to the operating space, and acquiring, by a controller, cell information related to a cell of the plurality of cells that the robot is positioned in. The method may also include generating position information of the robot based on the position information acquisition technique, the acquired sensor data, and the acquired cell information.

According to an embodiment of the present disclosure, a robot using a heterogeneous position information acquisition mechanism in an operating space may include a memory and a controller. The memory may store two or more pieces of information on at least two divided cells of the operating space and at least one position information acquisition mechanism used for at least one cell. The controller may acquire information on the cell where the robot is located, of the operating space, and may input sensing information acquired by a sensor of the robot to the at least one position information acquisition mechanism set for the at least one acquired cell to generate the position information of the robot.

According to an embodiment of the present disclosure, a cloud server may use a heterogeneous position information acquisition mechanism in an operating space and may include a memory and a server controller. The memory may store two or more pieces of information on at least two divided cells of the operating space where the robot moves and at least one position information acquisition mechanism used for at least one cell. The server controller may input sensing information received by a communicator of the server to the position information acquisition mechanism set for the cell of the operating space, where the robot is located, and may generate the position information of the robot to provide the communicator with the position information.

According to an embodiment of the present disclosure, a method for using a heterogeneous position information acquisition mechanism in an operating space may include storing, by a memory of a robot, at least two pieces of information on at least two divided cells of the operating space where the robot moves and at least one position information acquisition mechanism for at least one cell, generating, by a sensor of the robot or a communicator of the robot, at least one of GPS coordinate information, identification information of a wireless network, identification information of a mobile communication network, sensor information, or external map information, acquiring, by a controller of the robot, the cell information based on the generated information, and generating, by the controller, the position information of the robot by inputting sensing information acquired by the sensor to the position information acquisition mechanism set for the acquired cell.

When embodiments of the present disclosure are applied, the robot or the cloud server may acquire the cell information to precisely acquire the position information.

When embodiments of the present disclosure are applied, the robot or the cloud server may divide the outdoor space into cells to quickly acquire the position information through at least one mechanism optimized for at least one cell, thereby increasing speed of and improving precision in acquisition of the position information.

When the embodiments of the present disclosure are applied, the robot or the cloud server may acquire the position information through the position information acquisition mechanism optimized for at least one cell of the outdoor space.

Specific effects of the present disclosure, in addition to the above-mentioned effects, will be described together while describing specific matters to implement the present disclosure.

DETAILED DESCRIPTION

Figure 1:
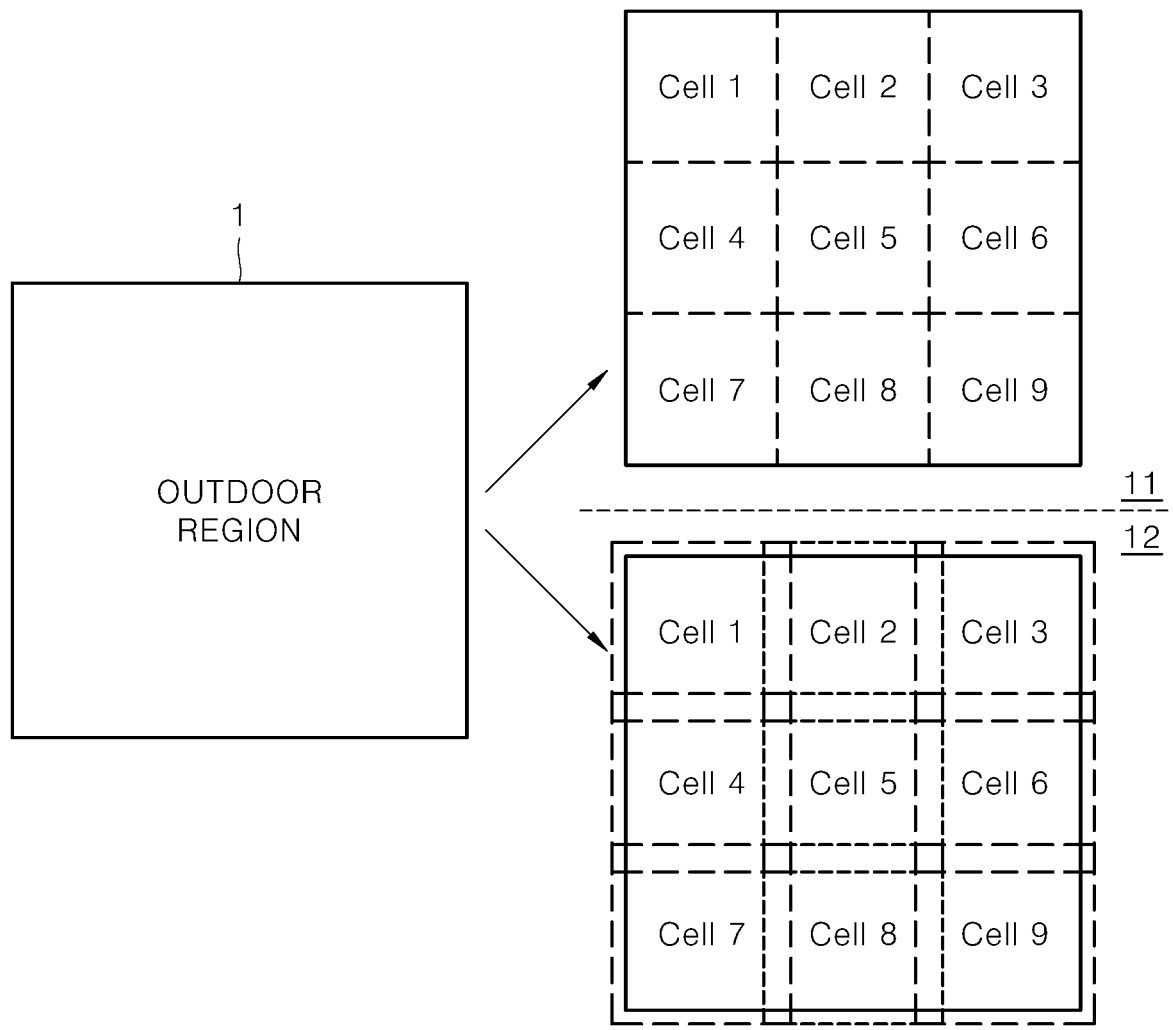
FIGS. 1 to 3 show an example large operating space divided into a plurality of cells, where a robot moves according to an embodiment of the present disclosure.

The above-mentioned objects, features, and advantages of the present disclosure will be described in detail with reference to the accompanying drawings, so that those skilled in the art to which the present disclosure pertains can easily implement the technical idea of the present disclosure. A detailed description of a well-known technology relating to the present disclosure may be omitted if it unnecessarily obscures the gist of the present disclosure. One or more embodiments of the present disclosure will be described below in detail with reference to the accompanying drawings. Same reference numerals in the drawings can be used to refer same or similar components.

Hereinafter, exemplary embodiments of the present disclosure will be described in detail with reference to the accompanying drawings so that they can be easily practiced by those skilled in the art. The present disclosure may be embodied in many different manners and should not be construed as being limited to the embodiments set forth herein.

Also, portions not necessary to describe the present disclosure will be omitted for clarity. Moreover, the same or similar elements are designated by the same reference numerals throughout the disclosure. Also, some embodiments of the present disclosure will be described in detail with reference to the accompanying drawings. In adding reference numerals to elements in each figure, it should be noted the same elements will be designated by the same reference numerals, if possible, although they are shown in different drawings. Further, in the following description of the present disclosure, a detailed description of known elements or functions will be omitted when it may make the subject matter of the present disclosure rather unclear.

Terms such as first, second, A, B, (a), (b) and the like may be used herein when describing elements of the present disclosure. These terms are intended to distinguish one element from other elements, and the essence, order, sequence, or number of corresponding elements is not limited by these terms. It should be noted that if it is described in the present disclosure that one component is "connected," "coupled" or "joined" to another component, the former may be directly "connected," "coupled" or "joined" to the latter or "connected," "coupled" or "joined" to the latter via another component.

Terms such as first, second, and the like may be used herein to describe elements of the present disclosure. These elements are not limited by these terms. These terms are intended to distinguish one element from another element. A first element may be a second element unless otherwise stated.

Unless otherwise stated, each component may be singular or plural throughout the disclosure. Further, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In the present disclosure, unless otherwise stated, "A and/or B" means A, B or A and B. Unless otherwise stated, "C to D" means "C or more and D or less".

Further, for convenience of description, one element may be described as its sub-elements in implementing the present disclosure; however, the sub-elements may be implemented within a single device or module in an integrated manner or implemented within multiple devices or modules in a distributed manner.

Hereinafter, in the present disclosure, the robot includes devices having various shapes, and that have specific purposes (e.g., delivery, cleaning, security, monitoring, guidance, and the like) or move and perform functions according to properties of the operating space where the robot operates or moves. Therefore, according to the present disclosure, the term robot collectively refers to a device that includes a mover that may move based on predetermined information and using a sensor and performs a predetermined function. Further, in the description below, the operating space of the robot is described as an outdoor region. However, this is not a requirement. And, in general, the operating space may be any space (outdoor, indoor, indoor and outdoor, etc.) that the robot operates in.

In the present disclosure, the robot with a map may move. The map refers to information on fixed objects such as images of streets, fixed walls, buildings, furniture, and stairs that are found not to move in space. In some examples, information on moving obstacles that are disposed periodically, that is, dynamic objects, may further be stored in the map.

In the present disclosure, the robot may transmit and receive information to and from a cloud server through communication to acquire precise position information while moving in the operating space (e.g., a large outdoor region). It should be noted that, as used herein, a cloud server or a computer sever refers to any type of computer system (desktops, laptops, multiple computers networked together, etc.). In this process, the robot may receive map information from the cloud server. Alternatively, the robot may transmit, to the cloud server, the information acquired by the robot within a predetermined range including the area where the robot is located.

The cloud server may process the received information to generate new map information and may transmit the map information to the robot. The robot may determine the current position of the robot based on the received information or information stored in the robot.

The robot may acquire the position information such that the robot moves in the large outdoor region. However, as the large outdoor region includes various types of spaces, if the position information of the robot may not be acquired using a single mechanism, the precision thereof may be degraded. Accordingly, the robot may divide the large outdoor region into the cells and may set different position information acquisition mechanisms for each cell, in order to acquire the current position of the robot.

A robot 100 is described below. In some embodiments, operations performed by the robot 100 may also be performed by a cloud server 300 illustrated in FIG. 13. Accordingly, one or more operations performed by a controller 250 of the robot 100 may be performed by a server controller 350 of the cloud server 300.

According to an embodiment, the controller 250 of the robot 100 (see FIG. 4) and the server controller 350 of the cloud server 300 (see FIG. 13) may perform the cell information acquisition technique or process (referred to herein as the cell information acquisition mechanism) or the position information acquisition technique or process (referred to herein as the position information acquisition mechanism) described herein. Alternatively, the controller 250 of the robot 100 may not perform the position information acquisition mechanism described herein based on a computing power and a communication state.

In this case, the server controller 350 of the cloud server 300 may perform the position information acquisition mechanism. The robot 100 may also transmit, to the cloud server 300, an image and a LiDAR frame used to perform the position information acquisition mechanism. As would be recognized by persons skilled in the art, LiDAR is a method that measures distance to a target by illuminating the target with light (e.g., laser light) and measuring the reflected light with a sensor.

Alternatively, the controller 250 of the robot 100 may not perform the cell information acquisition mechanism based on the computing power and the communication state and the server controller 350 of the cloud server 300 may perform the cell information acquisition mechanism. In this case, the robot 100 may transmit, to the cloud server 300, information used to perform the cell information acquisition mechanism.

Figure 2:
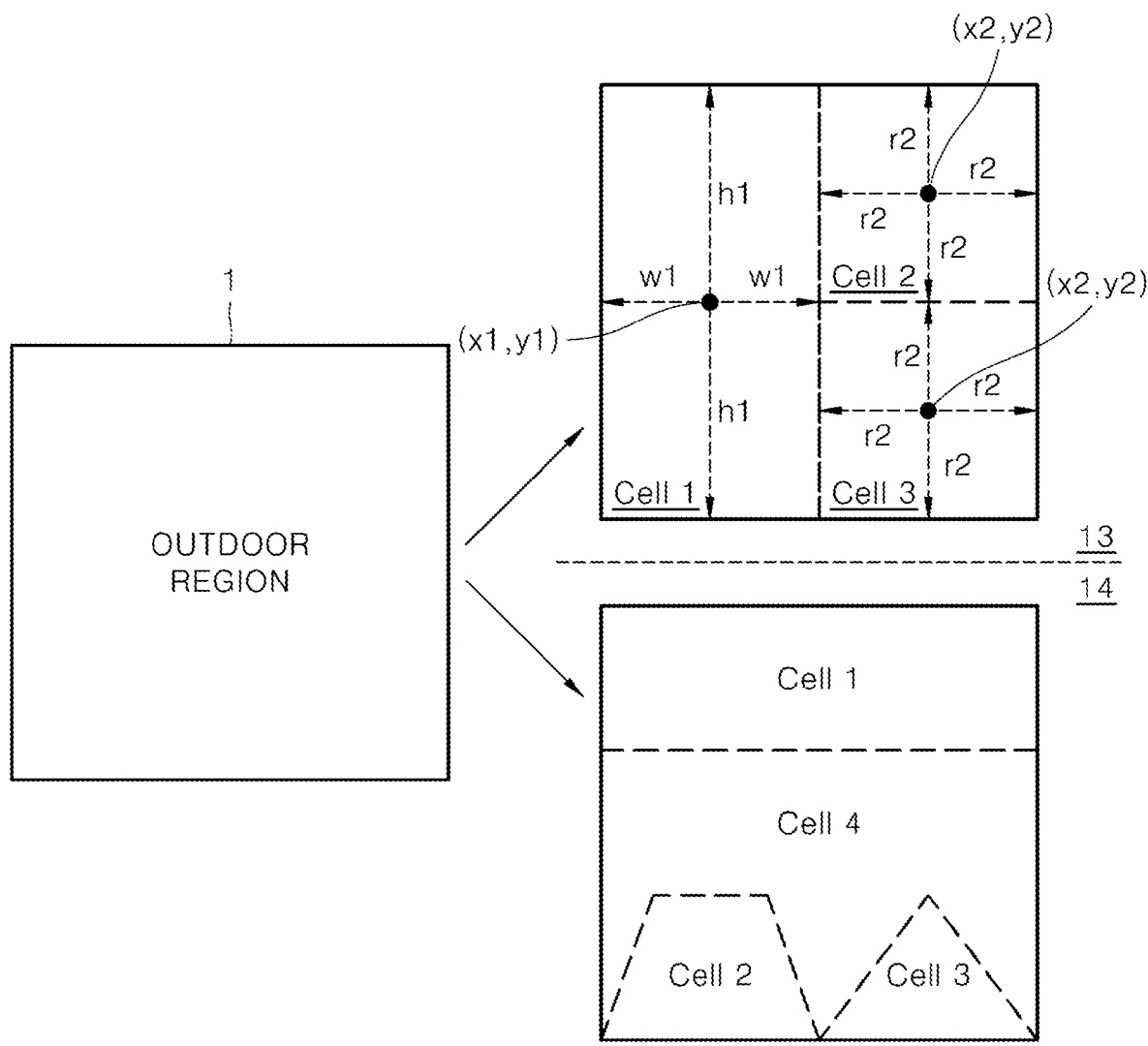
Figure 3:
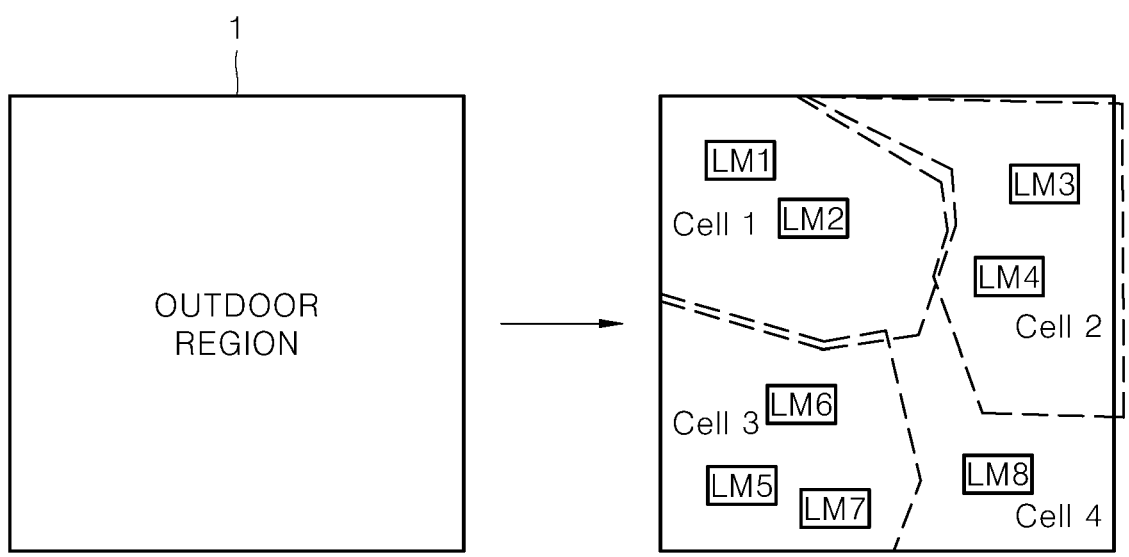

FIGS. 1 to 3 respectively show an exemplary operating space, divided into at least two cells, where a robot operates according to an embodiment of the present disclosure.

As explained above, in the description below, the operating space of the robot is described as an outdoor space. As shown in FIG. 1, a large outdoor region 1 where the robot operates (e.g., moves in) is divided into a plurality of cells (e.g., Cell 1 to Cell 9). The division of region 1 into the cells is shown using reference numerals 11 and 12 in FIG. 1. In reference numeral 11, the cell areas do not overlap each other. Instead, adjacent cells have overlapping borders. In reference numeral 12, at least two adjacent cells have areas that overlap. Alternatively, some adjacent cells may have areas that overlap, while some adjacent cells may not have areas that overlap with one another. FIG. 1 shows example cells having the same size and shape. However, this is not a requirement.

FIG. 1 shows rectangular cells, but the present disclosure is not limited thereto. Example cells may have polygonal shapes such as triangles/pentagons, circles, ovals, or various types of shapes.

As shown using reference numeral 13 in FIG. 2, the cells of the large outdoor region 1 where the robot moves may have different sizes. Reference numeral 13 shows an example size of Cell 1 greater than the size of each of Cell 2 and Cell 3. For example, an area covered by Cell 1 may be processed through a first position information acquisition mechanism or process, an area covered by Cell 2 may be processed through a second position information acquisition mechanism or process, and an area covered by Cell 3 may be processed through a third position information acquisition mechanism or process.

As shown using reference numeral 14 in FIG. 2, the cells of the large outdoor region 1 where the robot moves may have different sizes and shapes. A cell (Cell 1) has a quadrangle shape, Cell 2 has a trapezoidal shape, and Cell 3 has a triangle shape. Cell 4 includes the remaining area of outdoor region 1 (e.g., the area of outdoor region 1 not covered by Cells 1-3).

FIG. 3 shows an example large outdoor region 1 divided into cells (e.g., Cell 1 to Cell 4) with irregular closed curves.

As shown in FIGS. 1 to 3, the outdoor region may be divided into the cells having the same size or different sizes. The cells may have various types of shapes, for example, quadrangles, circles, polygons, ovals, and irregular closed curves.

In some embodiments, an optimal position information acquisition mechanism is performed for each cell. Accordingly, different position information acquisition mechanisms may be set for each cell. In some embodiments, different position information acquisition mechanisms may be performed for different cells. The robot calculates approximate current position of the robot to determine which cell defines the current position of the robot. The robot acquires precise position information through the position information acquisition mechanism set for the determined cell.

As shown in FIGS. 1 to 3, after dividing outdoor region 1 into a plurality of small cell units, a target environment or a target space where the robot moves, the position information acquisition mechanism optimized for each cell is set. The robot may perform relocalization using the position information acquisition mechanism.

Each of the target spaces may be divided into a plurality of cells according to various criteria. In one embodiment, cell ranges may be determined based on GPS coordinates. In reference numeral 13 of FIG. 2, a range having an upper distance and a lower distance of h1, and a left distance and a right distance of w1, with respect to (x1, y1) as a center point GPS coordinate may be set as an area of Cell 1.

The robot may use a first position information acquisition mechanism PIAM_1 as an example of a position information acquisition mechanism (PIAM) at a position in Cell 1.

Similarly, a range defined based on an upper distance, a lower distance, a left distance, and a right distance of r2 with respect to a GPS coordinate (x2, y2) may be set as an area of Cell 2. The robot may use a second position information acquisition mechanism (PIAM_2) as an example of the position information acquisition mechanism at a position in the Cell 2.

Similarly, a range defined based on an upper distance, a lower distance, a left distance, and a right distance of r2 with respect to a GPS coordinate of (x2, y3) may be set as an area of Cell 3. The robot may use a third position information acquisition mechanism PIAM_3 as an example of the position information acquisition mechanism at a position in Cell 3.

In the case where the outdoor region is divided into the cells as shown in reference numeral 13 of FIG. 2, the robot may determine that the robot is located in one of Cell 1 to Cell 3 by checking the GPS coordinate. Information on center coordinates of cells and the upper distance, the lower distance, the left distance, and the right distance (h, w1, r1, and r2) may be stored with the cell information as shown in Table 1.

TABLE 1

| Position Coordinate | Cell Information | Position Information Acquisition Mechanism |
|---|---|---|
| {(x1, y1), h1, w1} | Cell 1 | PIAM_1 |
| {(x2, y2), r2} | Cell 2 | PIAM_2 |
| {(x2, y3), r2} | Cell 3 | PIAM_3 |

When Table 1 and reference numeral 13 in FIG. 2 are applied, the cell may be determined based on the current position information of the robot and the controller 250 may call and execute a function corresponding to the cell, i.e., perform position information acquisition mechanism for the cell.

The coordinate information shown in reference numeral 13 of FIG. 2 may be generated based on various pieces of position information as well as the GPS coordinate. In the case where the range of each of the cells is determined based on the position information acquired using a predetermined method and the at least one position information acquisition mechanism used for the at least one cell is stored as shown in Table 1, when the robot performs the relocalization later, the robot performs a two-step process of (i) determining which one of Cell 1 to Cell 3 defines the position of the robot and (ii) performing the relocalization through the mechanism for the corresponding cell.

Another embodiment of each of the cell ranges may be determined based on information related to a communication network. In reference numeral 14 of FIG. 2, in the case where the robot is located in each of the cells, the cell may be set based on information on access point (AP) of the wireless network (Wi-Fi) scanned at the current position of the robot located in each of the cells, base station information related to the mobile communication network and the position information acquisition mechanism for the corresponding cell may be set as shown in Table 2.

TABLE 2

| Communication-related Information | Cell Information | Position Information Acquisition Mechanism |
|---|---|---|
| SSID1 | Cell 1 | PIAM_1 |
| ESSID2 | Cell 2 | PIAM_2 |
| mac address3 of Wi-Fi AP | Cell 3 | PIAM_3 |
| Cell ID4 of Base Station | Cell 4 | PIAM_4 |

As described in Table 2, each of the cells may be determined based on communication-related information (e.g., identifiers).

The areas divided based on service set identifier (SSID) and extended service set identifier (ESSID) to designate Wi-Fi local network or medium access control (mac) address of the Wi-Fi AP may be set as cells and each of the cell information and one of the position information acquisition mechanisms may be combined with each other.

Alternatively, in a mobile communication network (e.g., a cellular network) such as 3G/4G/5G, areas (divided based on a base station cell ID and a relay cell ID) covered by one base station or a relay that performs similar function to that of the base station may be set as cells and the at least one cell may be combined with the at least one position information acquisition mechanism to determine the cell based on the identification information of the base station/the relay.

When Table 2 and reference numeral 14 of FIG. 2 are applied, the robot may determine the cell based on obtainable communication-related information obtained by the robot (SSID, ESSID, mac address, base station, for example) and the controller 250 may call and execute the function corresponding to each of the cells. This means that the controller 250 may apply the mechanism according to each of the cells.

In the case where the position information acquisition mechanisms used for each cell is stored as described in Table 2, when the robot performs the relocalization later, the robot performs a two-step process of (i) determining which one of Cell 1 to Cell 4 defines the position of the robot based on the currently identified communication-related information and (ii) performing the relocalization using the mechanism for the corresponding cell.

In the above process, the robot may select the position information acquisition mechanism based on a signal having highest strength among signals received from the Wi-Fi AP scanned at the current position of the robot or the BS of the mobile communication network (e.g., the cellular network).

The Wi-Fi AP-related information or base station information of the mobile communication network used to designate the area is also stored in the memory 210 in combination with the position information acquisition mechanism using a hash table, thereby reducing a search time during subsequent acquisition of the position information. In this case, the search time may be "search time O(1)".

As shown in FIG. 3, the controller 250 may store, in the memory 210, characteristic landmarks of each of the cells and may store, in the memory 210, cell information corresponding to each of the landmarks and the position information acquisition mechanism.

For example, in FIG. 3, the controller 250 may perform the object detection and may select a landmark object having important discrimination, from images acquired in cells. Each of the landmarks LM1 to LM8 may be stored for each cell as shown in Table 3 below. The cell including the current position of the robot is determined to be Cell 1 when the image acquired while the robot moves in the corresponding region is identical to, or similar to, a specific landmark LM1.

TABLE 3

| Landmark | Cell Information | Position Information Acquisition Mechanism |
| --- | --- | --- |
| LM1, LM2 | Cell 1 | PIAM_1 |
| LM3, LM4 | Cell 2 | PIAM_2 |
| LM5, LM6, LM7 | Cell 3 | PIAM_3 |
| LM8 | Cell4 | PIAM_4 |

Table 3 shows an example of stored cell information corresponding to at least one landmark and at least one position information acquisition mechanism set for at least one cell.

When Table 3 and FIG. 3 are applied, the controller 250 performs the object detection using an algorithm such as YOLOv3, Fast R-CNN for the image photographed by the robot. The controller 250 automatically or manually extracts and acquires a landmark object identified through the object detection, from the photographed image, and compares the identified landmark object with each of the landmarks in Table 3.

The robot may determine that the current position of the robot corresponds to Cell 2 in the case where the identified landmark is LM3 based on the comparison and may perform the relocalization through the position information acquisition mechanism PIAM _2.

In the case where the robot stores the position information acquisition mechanism used for each cell as described in Table 3, when the robot performs the relocalization later, the robot performs a two-step process of (i) searching, in Table 3, cells in which objects in images acquired at the current position are stored as landmarks and determining which one of Cell 1 to Cell 4 defines the position of the robot and (ii) performing the relocalization using the mechanism for the corresponding cell.

According to some embodiments, the position information acquisition mechanism (PIAM) optimized for each cell is based on the deep learning, or configured using a visual frame (image) acquired by a camera sensor, a LiDAR frame (e.g., LiDAR sensor data) acquired by a LiDAR sensor, or ultra-wideband (UWB), but the present disclosure is not limited thereto.

Figure 4:
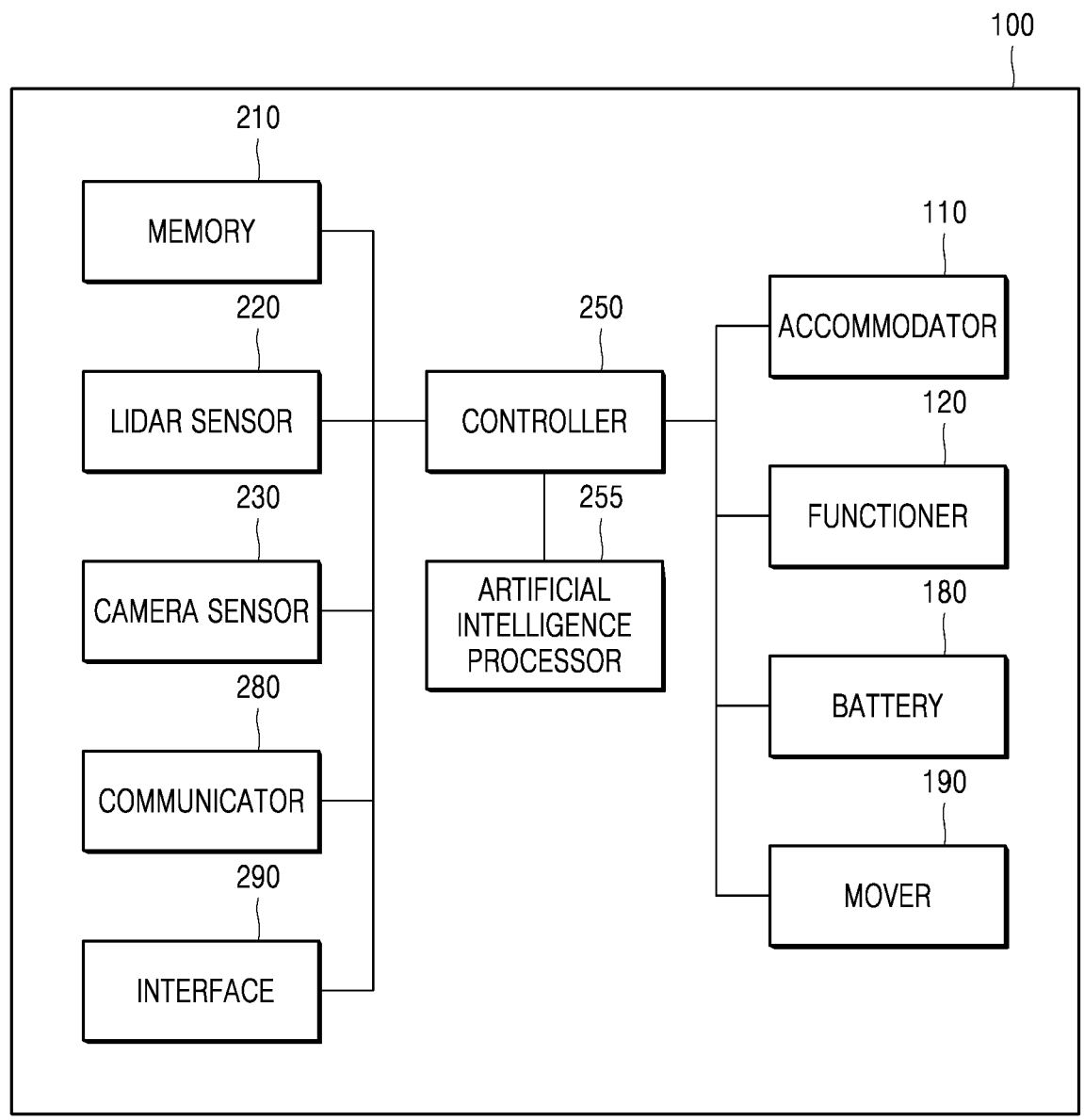
FIG. 4 is a block diagram showing example components of a robot according to an embodiment of the present disclosure.

FIG. 4 is a block diagram showing example components of a robot 100 according to an exemplary embodiment of the present disclosure.

The robot 100 may move in an outdoor space and may perform a predetermined function (e.g., delivery, cart, accommodation, guidance, security, and the like). For example, the robot 100 may acquire precise position information in the outdoor region in order to perform the delivery function.

The robot 100 in FIG. 4 moves in the outdoor region (e.g., outdoor region 1 of any of FIGS. 1-3), acquires cell information based on a current position of the robot, and selects a position information acquisition mechanism corresponding to the cell information to acquire precise position information.

Robot 100 optionally includes an accommodator 110. The accommodator 110 defines a space where objects are accommodated or stacked by a user. In some examples, the robot may include the accommodator 110 and may move while following users. Alternatively, the accommodator 110 may be mounted on the robot 100 to load objects such that the robot 100 performs the delivery function. In some examples, the delivery robot 100 may unload the objects at a designated position or may load objects disposed outside into the accommodator 110. The products may be automatically loaded onto or unloaded from the accommodator 110 or the accommodator 110 may change a loading sequence of the one or more products.

Robot 100 may also include a functioner 120 that performs a predetermined function assigned to the robot. The functioner 120 of a robot that performs a cleaning function may include, for example, a damp cloth and a suctioner for cleaning. A functioner 120 of a robot for delivery may include an accommodation space and a transporter that moves accommodated luggage. A functioner 120 of a robot for security may include a tester (e.g., a tester that performs air quality inspection, explosives inspection, and the like) required for safety.

Battery 180 of robot 100 may provide electrical energy required for the robot 100 to operate, and the mover 190 may perform a moving function of the robot 100.

The robot 100 may include a mover 190 including an actuator or a motor to perform various kinds of physical operation such as moving joints of a robot. In some examples, the movable robot includes a mover and the mover includes wheels, a brake, a propeller, and the like, and may travel on the ground or fly in the air through the mover.

The robot may further perform autonomous driving. Autonomous driving refers to self-driving technology, and the autonomous robot travels without manipulation of users or with minimum level of manipulation of users.

For example, autonomous driving may include technology for maintaining a predetermined distance with an obstacle in a space where the robot travels, technology for automatically adjusting speed of the robot such as adaptive cruise control, technology for automatically driving along a predetermined path of the robot, and technology for automatically setting a path of a robot based on set destination of a robot to travel.

The robot 100 may include an internal combustion engine or an electric motor for autonomous driving, and the internal combustion engine and the electric motor may be sub-components of the mover 190.

The robot 100 includes a controller 250 that controls the above-described components. The controller 250 may further include an artificial intelligence processor 255.

The controller 250 also controls a memory 210, a LiDAR sensor 220, a camera sensor 230, and a communicator 280 as components of the robot 100.

In some embodiments, the memory 210 may store two or more pieces of information on at least two divided cells of the outdoor region where the robot moves and the position information acquisition mechanism for each cell. For example, according to examples of FIG. 1, the memory 210 may store information on an area of each of cells Cell 1 to Cell 9 of the outdoor region and information on the position information acquisition mechanism used for each cell.

An example of the position information acquisition mechanism includes a deep learning model that acquires the position information of the robot 100 using the image obtained from the corresponding cell. Alternatively, in one embodiment, the position information acquisition mechanism is used to acquire the position information of the robot 100 based on feature using the image acquired by the camera sensor 230. Alternatively, according to an embodiment, the position information acquisition mechanism is used to acquire the position information of the robot based on the LiDAR sensor data acquired by the LiDAR sensor 220.

A LiDAR sensor 220 may sense nearby objects in two dimensions or in three dimensions. The two-dimensional (2D) LiDAR sensor may sense the location of an object in a range of 360 degrees or less with respect to the robot. LiDAR information obtained through such sensing at a specific location is example sensor data.

Alternatively, the sensor data obtained by the LiDAR sensor 220 may be referred to as "a LiDAR frame". That is, the LiDAR sensor 220 senses a distance between a robot and an object disposed outside the robot to generate the LiDAR frame.

In an embodiment, a camera sensor 230 is a general camera. In some embodiments, two or more camera sensors 230 may be used to overcome limitations on viewing angles. Images captured at specified location form image information. That is, in an embodiment, image information generated by photographing, by the camera sensor 230, an object disposed outside the robot is example sensor data.

Alternatively, the sensor data obtained by the camera sensor 230 may be referred to as "a visual frame". That is, the camera sensor 230 photographs the outside of the robot 100 and generates the visual frame.

According to the present disclosure, the robot 100 performs simultaneous localization and mapping (SLAM) using any one or both of the LiDAR sensor 220 and the camera sensor 230.

During the SLAM process, the robot 100 may perform map generation or location estimation using the LiDAR frame and the visual frame independently or in combination.

Interface 290 or robot 100 receives information from a user. Various pieces of information such as touch input and voice input are received from the user and the result thereof is output. The interface 290 may also output a sound to inform people that the robot 100 is approaching while moving. For example, the interface 290 may provide external people with predetermined visual or auditory information. For example, the interface 290 may receive voice commands from external people or may receive input through a touch screen.

The controller 250 acquires information on the cell where the robot 100 is located in the outdoor region and inputs the sensing information acquired by the sensor (e.g., the LiDAR sensor and/or the camera sensor) to the position information acquisition mechanism set for the acquired cell to generate the position information of the robot. The controller 250 controls the mover 190 based on the sensing information and the mover 190 moves the robot under the control of the controller 250.

The controller 250 may also include a wheel encoder. The wheel encoder generates wheel odometry information by collecting information on rotation or direction of wheels of the mover of the robot. The controller 250 may calculate a moving distance or a moving direction of the robot based on the information generated by the wheel encoder.

The communicator 280 allows the robot 100 to communicate with another robot or an external cloud server to transmit and receive information. The communicator 280 may also acquire information on an external communication environment such that the robot 100 identifies the cell information.

For example, the communicator 280 may acquire base station information of wireless network and base station information of the mobile communication such as cellular network based on the current position of the robot 100. The information may be stored in the memory 210 in advance together with the cell information such that the robot 100 may search and use the information.

The artificial intelligence processor 255 of robot 100 is described below. The artificial intelligence processor 255 may be implemented as software, hardware, and the artificial intelligence processor 255 may be subcomponent of another processor, module, or unit.

According to the configuration of FIG. 4, the robot 100 uses a specific position information acquisition mechanism for each sub-area (e.g., each cell) of the large outdoor region 1 (of FIGS. 1-3), thereby improving the precision of, and increasing the speed in the acquisition of, the position information. In some examples, as the outdoor region has different features for each specific sub-area (e.g., for each cell), the robot 100 may acquire the position information using a position information acquisition mechanism well-suited for each cell.

Figure 5:
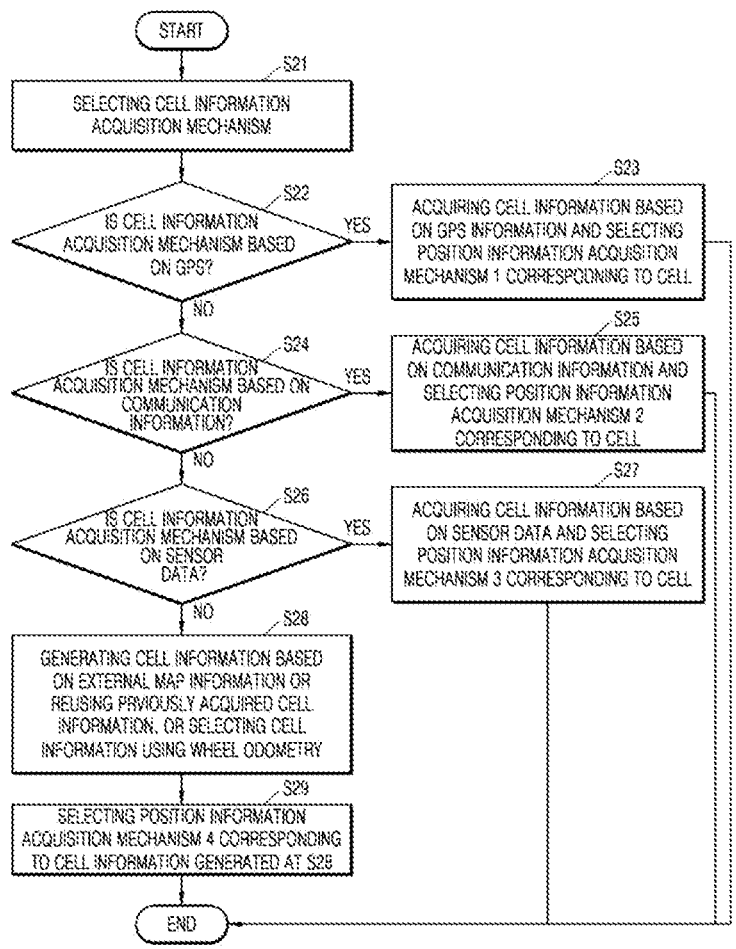
FIG. 5 is a process flow diagram showing an example method for acquiring, by a robot, cell information according to an embodiment of the present disclosure.

FIG. 5 is a process flow diagram showing an example method for acquiring, by a robot, cell information according to an embodiment of the present disclosure. The robot may use current position information of the robot or communication properties (e.g., wireless network and mobile communication network) related to a space where the robot is currently located in order to acquire the cell information.

Alternatively, external map information related to the space where the robot is currently located or predetermined image information or landmark information acquired by the robot at the current position may be used in order for the robot to acquire the cell information.

Controller 250 of the robot 100 determines a cell information acquisition mechanism usable at the current position of the robot. For example, the robot 100 may determine the usable cell information acquisition mechanism based on GPS coordinate information, communication information, or landmark information and may acquire the cell information using the corresponding mechanism. The information generated during the acquisition of the position information, which is previously performed by the robot, may be used to select the cell information acquisition mechanism.

For example, in the case where the GPS information has degraded precision after the cell information is acquired based on the GPS coordinate information, the robot 100 may select a cell information acquisition mechanism other than the GPS.

In more detail, the controller 250 of the robot 100 selects a cell information acquisition mechanism (S21). The mechanism is configured to identify an approximate position of the robot 100. For example, the above mechanism is configured to determine which cell defines the position of the robot 100 to precisely identify the position of the robot 100.

An example of the cell information acquisition mechanism is as follows. A sensor 220, 230 or a communicator 280 of the robot 100 generates at least one of the global positioning system (GPS) coordinate information, identification information of a wireless network, or identification information of a mobile communication network. Alternatively, the sensor may generate an image, a LiDAR frame, and the like. The sensor may generate sensor information. Alternatively, the communicator 280 may receive external map information. The information on the cell where the robot is located may be acquired based on the information.

If the selected mechanism (e.g., the cell information acquisition mechanism) is based on the GPS (S22), the controller 250 of the robot 100 acquires the cell information based on the GPS coordinate information and selects position information acquisition mechanism 1 for the corresponding cell (S23).

If the selected mechanism is configured based on communication information (S24), the controller 250 of the robot 100 acquires the cell information based on the communication information and selects position information acquisition mechanism 2 for the corresponding cell (S25). Examples of the communication information may include the identification information of the wireless network or the identification information of the mobile communication network.

If the selected mechanism is configured based on the sensor data (S26), the controller 250 of the robot acquires the cell information based on the sensor data (e.g., the information acquired by the sensor) and selects position information acquisition mechanism 3 for the corresponding cell (S27). The sensor data refers to cell information identified based on the above information in the case where the camera sensor photographs surroundings and extracts important information such as landmarks from the photographed image.

In addition to S22, S24, and S26, the robot 100 may acquire the cell information in various ways as exemplified in S28. In an embodiment, the controller 250 of the robot may generate the cell information based on the external map information provided by external portal companies.

In an embodiment, the controller 250 of the robot 100 may reuse the cell information previously used. In the case where the robot may not move far from the previous position at which the cell information is acquired, the robot might be located in the same cell, thereby reducing a time taken to acquire the cell information by reusing, by the controller 250, the previously used cell information.

In an embodiment, the controller 250 of the robot 100 may select the cell information using a wheel odometry. The controller 250 may select a previous cell or a cell adjacent to the previous cell based on a moving direction and a moving distance of the robot at and from the position at which the previous cell information is acquired. For example, in reference numeral 14 of FIG. 2, the robot was located in Cell 4 at a first time point and may move until a second time point. In this case, the controller 250 may determine that the robot is located in Cell 6 at the second time point by calculating the moving distance and the moving direction from the first time point to the second time point. In this case, the controller 250 of the robot may determine that the robot 100 is located in Cell 6 corresponding to the cell information using the wheel odometry without other information.

S28 may be performed when the mechanism of each of S22 to S26 is not used or when the robot 100 moved from the previous time point by a less distance. Subsequently, the controller 250 of the robot 100 selects position information acquisition mechanism 4 used for the cell corresponding to the cell information acquired at S28 (S29).

The position information acquisition mechanisms 1 to 4 are optimized for each cell and may be set for each cell. The position information acquisition mechanism may be independent of the cell information acquisition mechanism.

An example of the position information acquisition mechanism may include a position information acquisition mechanism based on a deep learning, or a feature-based position information acquisition mechanism as a methodology other than the deep-learning based methodology, or a laser-based position information acquisition mechanism as a methodology other than the deep-learning based methodology. The controller 250 may apply the mechanism based on deep learning by using deep learning model or deep learning network for acquiring position information.

In one embodiment, in the case of the position information acquisition mechanism based on the deep learning, the deep learning model receives the image in the cell and outputs pose information of the robot such that the robot may acquire the position information. The robot 100 may perform the relocalization based on the acquired position information.

In an embodiment, absolute camera pose information or relative camera pose information, associated with image data, is collected from each cell using a 360 degree camera such as, for example, Ladybug. As shown in the following embodiments, deep learning models are learned for each cell based on the collected data. For example, the deep learning model provides the position information to the output when the image is input.

The deep learning models are learned for each cell such that specialized deep learning models may be generated for each cell. An example posenet may be used to generate a deep learning model specialized for each cell. The deep learning model may include a convolutional neural network (CNN) and may output pose information to an output node of the deep learning model when a single image is received at an input node of the deep learning. In this case, an example of the CNN includes GoogleNet.

According to another embodiment, the deep learning model may receive a plurality of continuous images at the input node and may output the pose information to the output node by reflecting correlations among the continuous images. In this case, the deep learning model may be a combination of the CNN and long short-term memory (LSTM).

According to another embodiment, the deep learning model may include a siamese neural network (SNN) and the pose information may be output to the output node by classifying the similar images acquired in different places.

The examples of the deep learning model correspond to embodiments of the present disclosure and the position information acquisition mechanism of the present disclosure may include various types of deep learning models as well as the deep learning model.

According to another embodiment of the present disclosure, the position information acquisition mechanism may be used to acquire the position information based on the feature from an image photographed by the camera sensor 230 without using the deep learning model. According to yet another embodiment of the present disclosure, the position information acquisition mechanism may acquire the position information based on distance information (related to the robot in a two-dimensional or three-dimensional space) acquired by the LiDAR sensor 220 without using the deep learning model.

Similarly, the robot may perform the relocalization based on the position information acquired through the above mechanisms.

Figure 6:
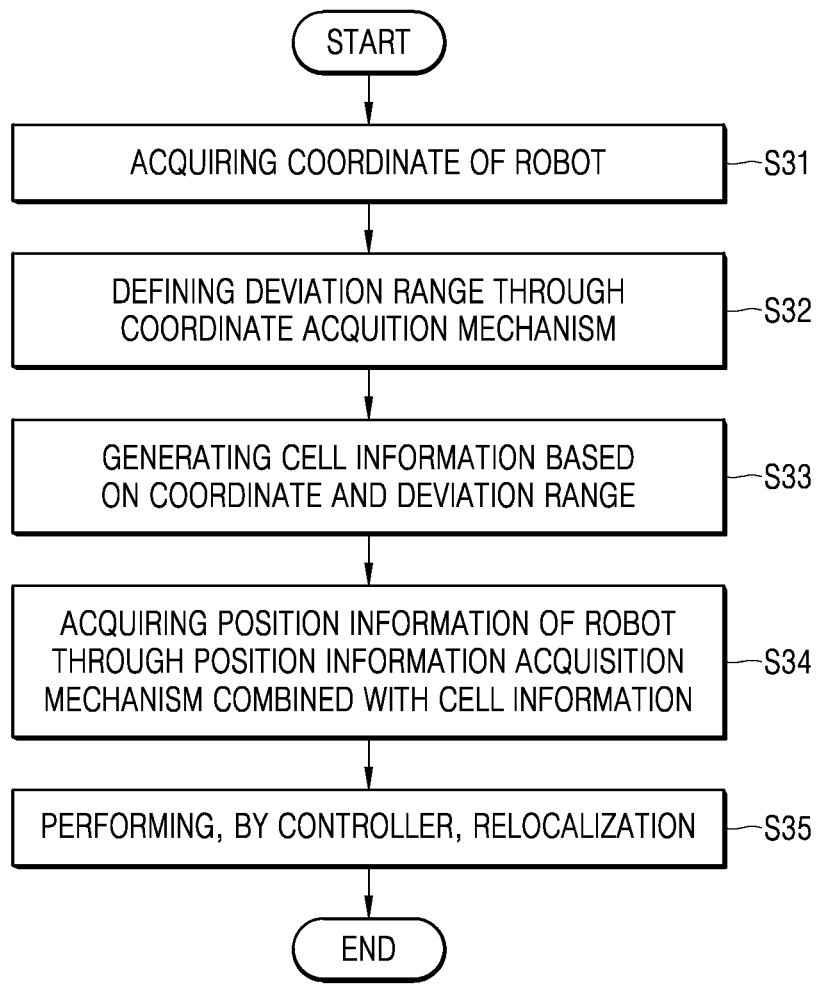
FIG. 6 is a process flow diagram showing an example method for acquiring cell information based on position coordinates according to an embodiment of the present disclosure.

FIG. 6 is a process flow diagram showing an example method for acquiring cell information based on position coordinates according to an embodiment of the present disclosure. The position coordinates include GPS coordinates, coordinates of an external map, or coordinates calculated based on landmark of an external image. The position coordinates each has a deviation within a predetermined range. The controller 250 of the robot may acquire the cell information in consideration of the deviation range.

The controller 250 of the robot acquires a coordinate (x, y) of the robot (S31). The method for acquiring the coordinate may be performed, for example, based on the GPS, the external map information, and external landmark identification.

A deviation range (e) of the calculated centroid coordinate of the robot is defined. The GPS coordinate deviation range, the deviation range defined based on the external map information, and the deviation range defined based on the external landmarks may be different from one another. Even when the GPS is used, if a difference between the GPS coordinate calculated through the identification of the position and a coordinate corresponding to an acquired actual position deviates from a reference range, the GPS coordinate deviation range may widen.

If the previous GPS coordinate is the same as the coordinate corresponding to the acquired actual position or falls within a minimum reference range, the GPS coordinate deviation range may be reduced. As the GPS coordinate deviation varies depending on the surrounding environment, the controller 250 of the robot increases or decreases the GPS coordinate deviation, thereby improving the precision thereof.

The increase or the decrease in the deviation range may be equally applied to a process of identifying external map information or external landmarks.

The controller 250 of the robot 100 defines the deviation range at S32 and then generates the cell information based on the coordinates and the coordinate deviation range (S33). For example, the controller 250 of the robot may form a circle having a radius corresponding to a distance "e" from a point represented as (x, y) and then may identify a cell that overlaps with that circle. In the case where the robot is located at a boundary between the at least two cells, the controller 250 of the robot may acquire the at least two pieces of cell information. In this case, the controller 250 of the robot may improve the precision using other cell information acquisition mechanisms.

The controller 250 of the robot 100 acquires the position information of the robot using the position information acquisition mechanism combined with the cell information generated at S33 (S34). The robot may perform the relocalization based on the acquired information (S35) to restore the position of the robot.

The relocalization includes re-estimating the current position of the robot 100 if the robot fails to identify the current position thereof.

In order to use the example of FIG. 6, the controller 250 may store cell information (including position information) and position information acquisition mechanism as shown above in reference numeral 13 of FIG. 2 and Table 1.

For example, the position information acquisition mechanism may be used for the cell overlapped with the circle having a radius corresponding to the deviation range (ei) of the GPS coordinate (xi, yi). For example, the memory 210 may store the information on the specific cell information combined with the specific mechanism used to perform the relocalization.

The position information acquisition mechanism may be used for each cell based on the position coordinate (xt, yt) identified through the localization of various types of SLAM such as visual SLAM. For example, the memory 210 may store the information on the specific cell information combined with the specific mechanism used to perform the relocalization.

When crossing the cell boundary, the controller 250 of the robot 100 may change the mechanism used to perform the relocalization.

The controller 250 of the robot 100 may generate the cell information based on coordinates and the coordinate deviation range using the external map information or the landmark information.

Figure 7:
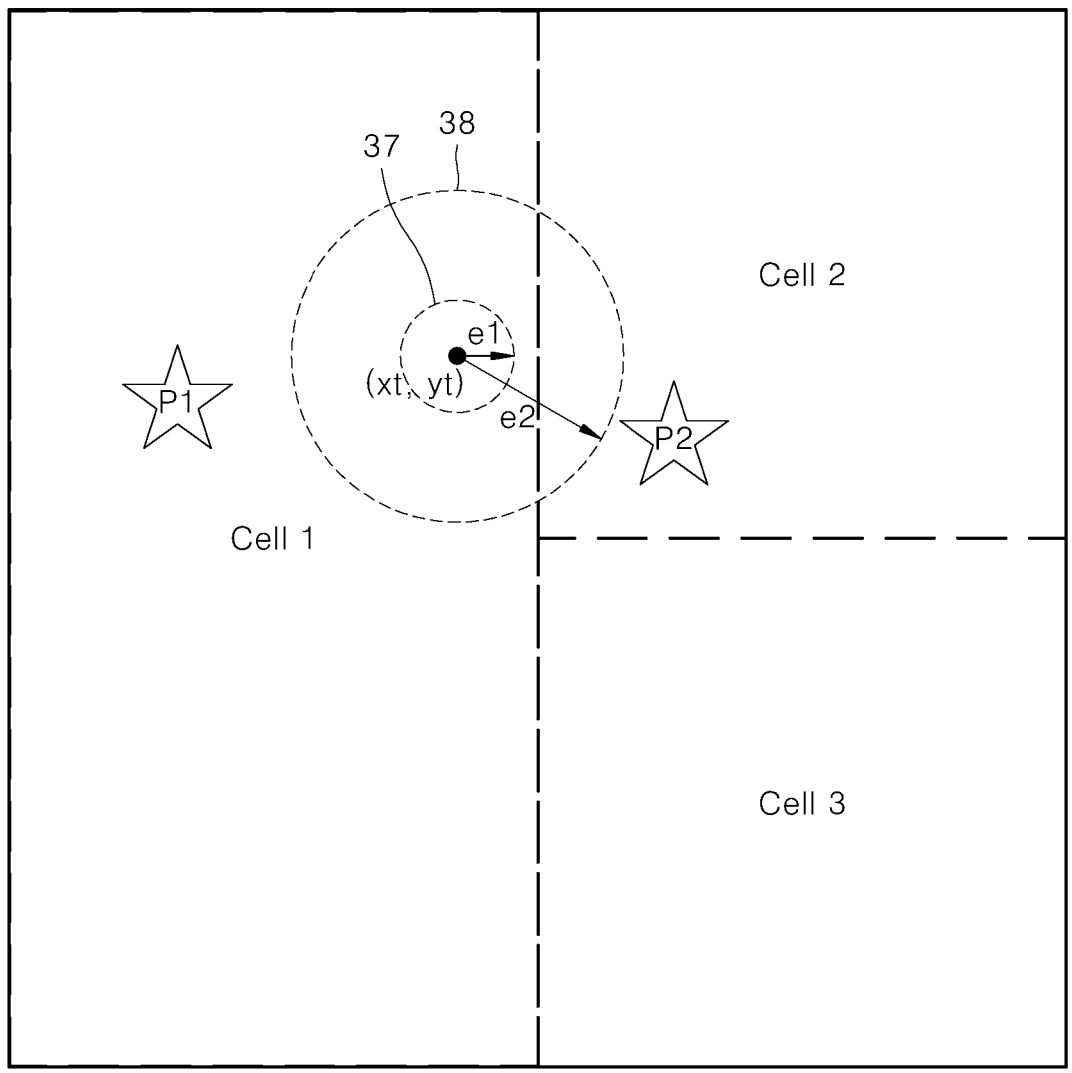
FIG. 7 shows an example process of acquiring cell information by calculating a coordinate of a robot according to an embodiment of the present disclosure.

FIG. 7 shows an example process of acquiring cell information by calculating a coordinate of a robot 100 according to an embodiment of the present disclosure. When an outdoor region is divided into cells as shown in reference numeral 13 in FIG. 2, a process of identifying, by a robot, cell information is described below. The center coordinates and ranges of the cells, which are shown in reference numeral 13 of FIG. 2, are omitted in reference numeral 13 of FIG. 7.

The coordinate currently determined, by the robot 100, through the GPS is (xt, yt). If no GPS coordinate deviation exists, the current coordinate information of the robot corresponds to (xt, yt) and the current coordinate is included in Cell 1.

If the GPS coordinate deviation is e1, the position range of the robot 100 may correspond to a circle 37 having a radius corresponding to the coordinate deviation el of (xt, yt). As the circle indicated by reference numeral 37 is still inside Cell 1, the precise position of the robot may be calculated using the PIAM_1 corresponding to the Cell 1 (see Table 1). For example, the controller 250 may perform the relocalization using the PIAM_1.

If the GPS coordinate deviation is e2, the position range of the robot 100 may correspond to a circle 38 having a radius of e2 with respect to (xt, yt). The circle indicated by reference numeral 38 is overlapped with Cell 1 and Cell 2. In this example, the robot 100 may determine the cell based on another mechanism or the previous position of the robot.

In the case where the previous position of the robot was P2 of Cell 2 and the robot 100 moved a less distance from the previous time point to the current time point, the robot determines that the robot is currently located in Cell 2. In the case where the precise position of the robot was P1 of Cell 1 and the robot moved by a less distance from the previous time point to the current time point, the robot determines that the robot is currently located in Cell 1.

For example, the controller 250 may reflect the moving distance and the moving direction of the robot to determine the cell.

Alternatively, the exact position of the robot may be calculated through the PIAM_1 used for Cell 1 and the PIAM_2 used for Cell 2.

As shown in FIG. 7, the controller 250 may determine the GPS coordinate deviation range. The deviation range may be previously fixed or may be updated during the previous position information acquisition. The controller 250 may determine at least one cell that overlaps with the circle within the GPS coordinate deviation range. In the case where only one piece of cell information is generated, the controller 250 selects the position information acquisition mechanism based on the corresponding cell information.

In the case where two or more pieces of cell information are generated, the controller 250 selects one of the two or more pieces of cell information and may reflect the cell information related to the previous position of the robot or the moving distance and direction of the robot during the selection.

As shown in FIG. 7, in the case where at least two cells where the robot is located are provided within the deviation range, the robot may select one from the at least two cells within the deviation range based on the previously acquired cell information. In this case, the controller 250 may estimate the current cell information based on the moving distance from and the moving direction at the previous cell. The controller 250 may generate moving distance and moving direction using wheel odometry. The above mechanism may also be applied to the various types of cell information acquisition mechanisms.

For example, at least two pieces of communication-related information may be overlapped in a boundary region of the cells. In the case where the robot 100 is located at the boundary between two base stations, identification information of each of the two base stations may be received. In this case, the robot 100 may acquire the cell information based on the identification information of the identifier provided to a strong signal of the two signals received from the two base stations. Alternatively, the robot 100 may acquire one piece of cell information based on the identification information of each of the two base stations by reflecting the moving distance from and the moving direction at the previous position of the robot in the cell.

Figure 8:
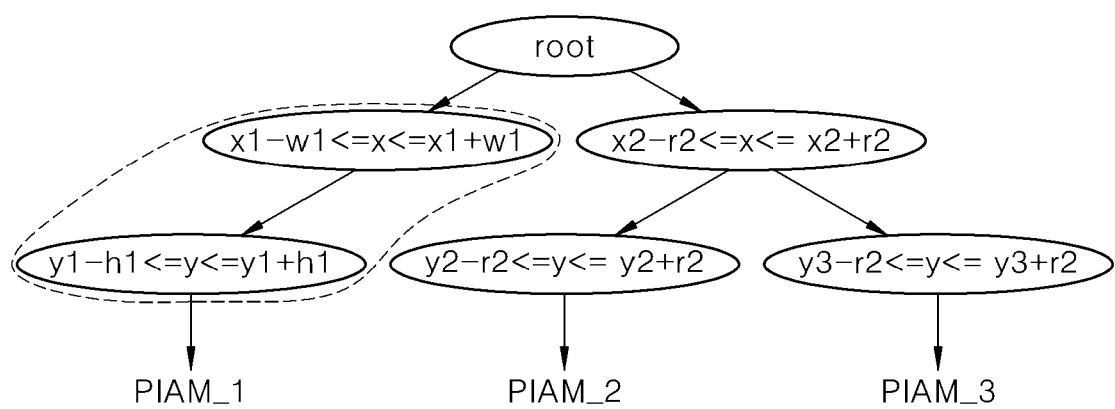
FIG. 8 shows an example tree structure listing conditions for executing position information acquisition mechanism based on coordinate information according to an embodiment of the present disclosure.

FIG. 8 shows an example tree structure listing conditions reflected for executing a position information acquisition mechanism based on coordinate information according to an embodiment of the present disclosure. FIG. 8 shows the tree structure according to Table 1 and with reference to reference numeral 13 of FIG. 2. A robot calculates a current coordinate (x, y) using various types of methods (e.g., through GPS or based on external map information). A range of value of each of x and y is determined according to the branched tree structure in FIG. 8 and is used to determine the cell and the position information acquisition mechanism. For example, three position information acquisition mechanisms are designated for each branch point.

In the case where the current coordinate of the robot 100 is included in Cell 1, the current coordinate (x, y) corresponds to dotted lines in FIG. 8. For example, condition of x: $x1-w1 \leq x \leq x1+w1$ is satisfied for the x coordinate value and condition for y: $y1-h1 \leq y \leq y1+h1$ is satisfied for the y coordinate value. In this example, the controller 250 may call a position information acquisition mechanism PIAM_1 to perform relocalization.

In the case where the current coordinate information is acquired using the GPS, the deep learning model suitable for the cell or the position information acquisition mechanism as a methodology may be called using the tree structure in FIG. 8. In the case where the deviation range of the position identified through the GPS exists, the controller 250 may precisely generate the cell information by applying examples of FIG. 7 or from a combination with other cell information acquisition mechanisms.

Figure 9:
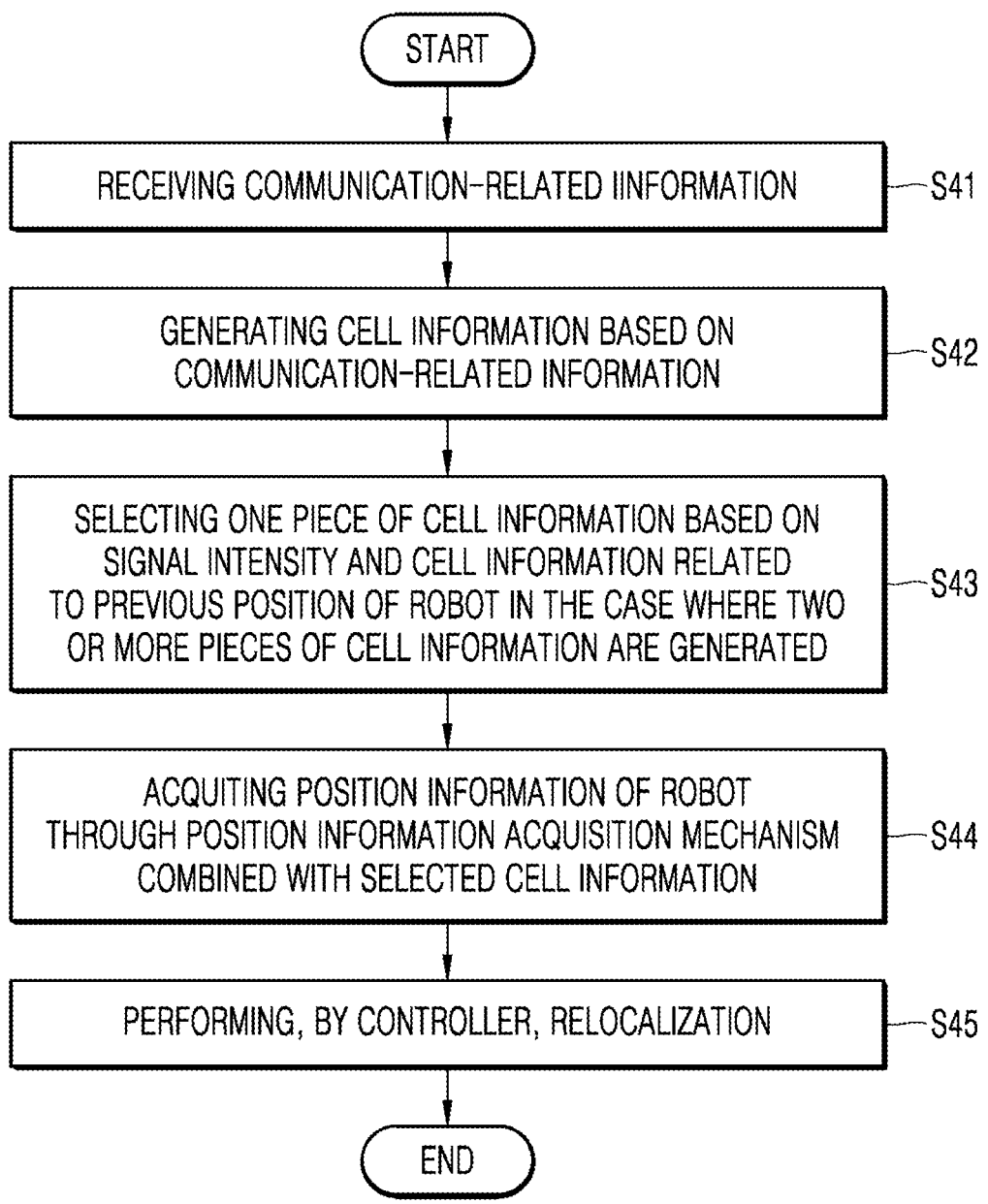
FIG. 9 is a process flow diagram showing an example method for acquiring cell information based on communication-related information according to an embodiment of the present disclosure.

FIG. 9 is a process flow diagram showing an example method for acquiring cell information based on communication-related information according to an embodiment of the present disclosure. The communication-related information corresponds to SSID and ESSID that designate local network in Wi-Fi, or mac address of Wi-Fi AP, the area or information on the area (divided based on base station cell ID and relay cell ID) of one base station or a relay that performs a similar function to that of the base station in mobile communication network (e.g., cellular network) such as 3G/4G/5G. The communicator 280 may receive or collect various pieces of communication-related information and may store the collected information.

Two or more pieces of communication-related information may be received based on the position of the robot. In this example, the controller 250 may select one piece of cell information based on intensity of a signal received by the communicator 280, and the cell information related to a previous position of the robot. The above configuration is described below in detail.

The communicator 280 of the robot 100 receives the communication-related information (S41). Examples of the communication-related information include information transmitted through the wireless network and the mobile communication network.

The controller 250 generates the cell information based on the communication-related information (S42). The controller 250 compares the information stored in the memory 210 as shown in Table 2 with the received information and generates the cell information. In the case where two or more pieces of cell information are generated, the controller 250 selects one piece of cell information based on the signal intensity and the cell information related to the previous position of the robot (S43).

For example, in reference numeral 14 in FIG. 2, the robot may receive the signal ESSID2 corresponding to Cell 2 and the signal (e.g., Cell ID4 of the base station) corresponding to Cell 4. In this case, a strong signal may be selected from the two signals. Alternatively, in the case where the received signal is a Wi-Fi related signal and a mobile communication-related signal, the controller 250 may assign priorities to the signal of the wireless network such as Wi-Fi. As the mobile communication-related signals have wide coverage while the wireless network signals have less coverage, the cell (e.g., Cell 2 in Table 2) corresponding to the signal is selected based on the received signal of the wireless network.

The controller 250 of the robot 100 acquires the position information of the robot using the position information acquisition mechanism combined with the cell information selected at S43 (S44). The robot may perform the relocalization based on the acquired information (S45) to restore the position of the robot. Relocalization includes re-estimating the current position of the robot if the robot fails to identify the current position of the robot.

In summary, the controller 250 may acquire the cell information based on identification information of the wireless network or identification information of the mobile communication network. The controller 250 may also acquire one piece of cell information based on the intensity or the coverage of the signal of the wireless network or the mobile communication network during the acquisition of the cell information.

In order to apply the example of FIG. 9, the controller 250 may store cell information (with the communication-related information) and position information acquisition mechanisms as shown in reference numeral 14 of FIG. 2 and Table 2.

Figure 10:
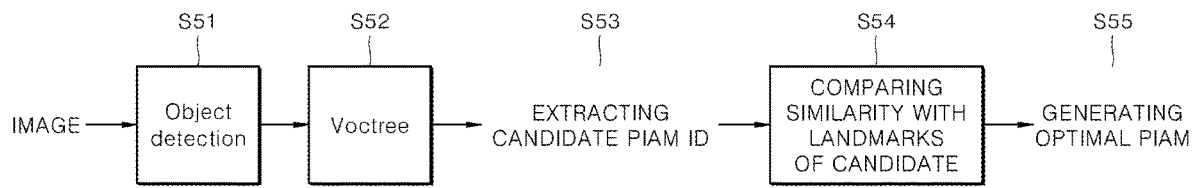
FIG. 10 is a process flow diagram showing an example method for acquiring cell information based on sensor data according to an embodiment of the present disclosure.

FIG. 10 is a process flow diagram showing an example method for acquiring cell information based on sensor data according to an embodiment of the present disclosure.

For example, a landmark object is extracted from an image photographed by a camera sensor 230 based on sensor data through object detection performed at S51. Information on the extracted object is input to a vocabulary tree (VocTree) (S52). A controller 250 extracts a candidate position information acquisition mechanism (i.e., candidate PIAM) ID (S53).

The controller 250 compares similarity with landmarks corresponding to the extracted the PIAM ID (S54). The controller 250 may perform the relocalization using a deep learning model corresponding to or a methodology of the PIAM ID based on the determined optimal PIAM ID.

As shown in Table 3, the controller 250 stores the landmarks for each area, compares the landmarks detected when the image is received with all entries in Table 3, respectively, generates the cell information related to most similar landmarks, and may derive the position information acquisition mechanism corresponding to the cell information (S55).

Alternatively, as shown in FIG. 10, the controller 250 reduces a search space for the detected object using VocTree and compares similarity between the detected object and the landmark determined through the candidate mechanism (e.g., a candidate model or a candidate methodology) and searches ID of a most similar mechanism (e.g., a most similar model or methodology). The controller 250 may also acquire the position information using the found mechanism.

Figure 11:
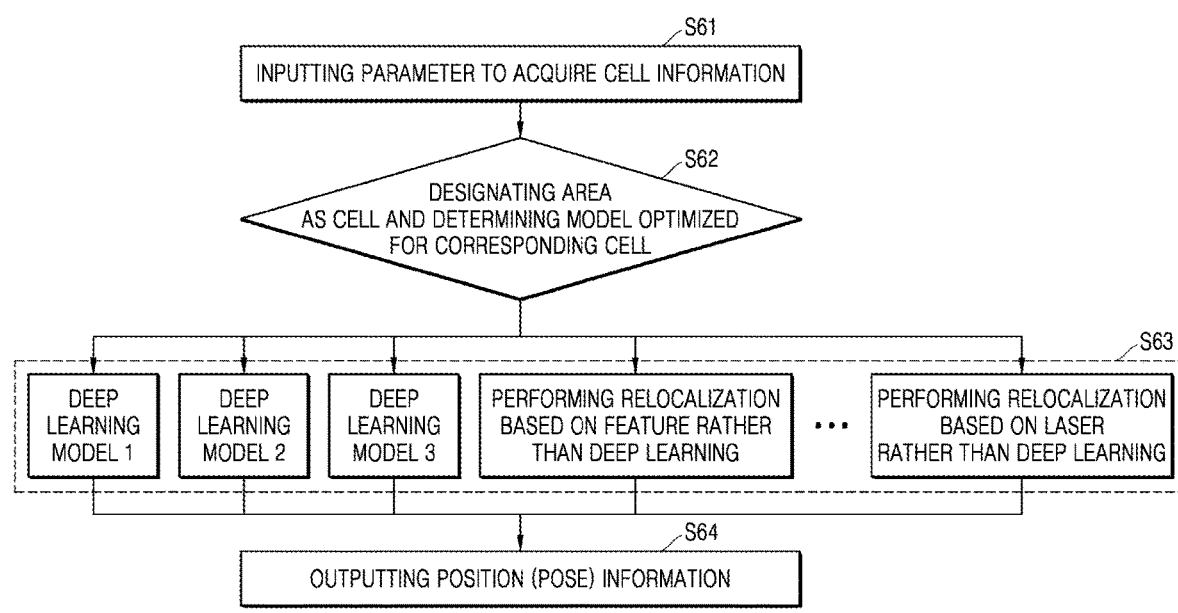
FIG. 11 is a process flow diagram showing an example method for using a cell information acquisition mechanism and a position information acquisition mechanism according to an embodiment of the present disclosure.

FIG. 11 is a process flow diagram showing an example method for using a cell information acquisition mechanism and a position information acquisition mechanism according to an embodiment of the present disclosure.

A controller 250 of a robot 100 receives parameters to acquire cell information (S61). The parameters include GPS coordinate information, external map information, sensor data, communication-related information, and the like, which have been previously identified.

The controller 250 designates a cell corresponding to a current area of the robot 100 based on the input information and determines a model optimized for the cell corresponding to the area, that is, a position information acquisition mechanism (S62).

As shown in Tables 1 to 3 above, the controller 250 of the robot 100 may use deep learning models 1 to 3 or a mechanism other than the deep-learning based mechanism through the position information acquisition mechanism optimized for each cell (S63). For example, the deep learning models 1 to 3 may be configured as examples of the position information acquisition mechanism.

In some examples, the controller 250 of the robot may perform relocalization based on feature rather than the deep learning or may perform the relocalization based on a laser rather than the deep learning.

According to an embodiment of the deep learning model, after sensor data is input to the deep learning model, an output of the deep learning model outputs pos (pose) information (S64).

For example, the camera sensor 230 photographs the surroundings to generate an image. In the case where the position information acquisition mechanism is the deep learning model, position information is output as follows. For example, the controller 250 inputs the image photographed by the camera sensor 230 to an input node of the deep learning model such that the deep learning model is used to generate the position information corresponding to the image.

In some examples, the position information acquisition mechanism may be used to generate the position information based on features rather than the deep learning.

Similarly, the camera sensor 230 photographs the surroundings to generate the image. The memory 210 stores a plurality of images photographed in a space corresponding to a cell for which the position information acquisition mechanism is used.

Alternatively, the memory 210 stores features of the images photographed in the space corresponding to the cell for which the position information acquisition mechanism is used.

The memory 210 also stores the position information related to each of the stored images or features.

In the case where the position information acquisition mechanism is configured based on the feature, the controller 250 searches, in the memory 210, the image photographed by the camera sensor 230 or the feature extracted from the photographed image. In the case where the image or the feature is found, the controller 250 generates the position information related to the stored image/feature.

Figure 12:
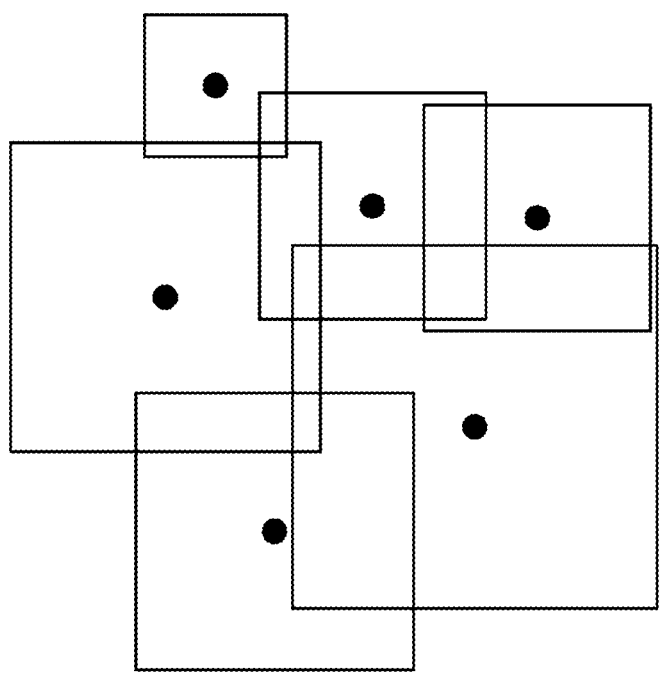
FIG. 12 shows an example entire space divided into at least two cells according to an embodiment of the present disclosure.

FIG. 12 shows an example entire space divided into at least two cells according to an embodiment of the present disclosure. The division into the at least two cells may be performed during movement of a robot 100. Alternatively, a central cloud server 300 (see FIG. 13) may collect information acquired by the robot 100 and then configure the cell.

FIG. 12 shows a plurality of cells having various sizes. The sizes or positions of the cells, or a degree of overlapping with other cells may be determined based on accuracy or speed in identification of position information of the robot. For example, the robot 100 or the cloud server 300 may reflect the following elements as a criterion for dividing into the cells and designating coverage covered by each of the cells.

The robot 100 sets at least one divided area to be at least one cell as an example of designating at least one area as at least one cell, such that the robot performs the relocalization in that cell. For example, the robot 100 or the cloud server 300 maps the area covered by Wi-Fi AP1 to one cell.

That is, the robot 100 or the cloud server 300 may form the cells such that the region covered by the Wi-Fi AP1 is not divided into a plurality of small relocalization cells. The robot 100 may have to search for additional sub-cells in the case where the region is divided into the sub-cells. In an embodiment using the communication-related information, the robot 100 or the cloud server 300 may set one cell for one area corresponding to the communication-related information in order to omit an additional search process.

Alternatively, the robot 100 or the cloud server 300 may designate the area covered by Wi-Fi AP1 and AP2 as one cell. In this case, the robot that has checked the Wi-Fi AP1 and the robot that has checked the Wi-Fi AP2 may be determined to be located in one cell and the position information identification mechanism may be selected.

In the case of the space such as an open ground, where the robot 100 only requires approximate position information because no colliding objects are present during the movement of the robot, the size of the cell is set to be greater. In this example, the size of the cell is increased and the position information acquisition mechanism, for example, a coarse-grained deep learning model is set for the corresponding cell.

In this case, the set position information acquisition mechanism may use a light model with a less amount of calculation. For example, the robot 100 or the cloud server 300 increases the size of the cell in the region where the position information may not be required to be precisely acquired, such that the relocalization may be performed by quickly identifying the position information.

By contrast, in spaces where a large number of objects are arranged or moved or people moves, such as cities or city centers, the robot 100 is frequently required to avoid collisions during the driving, and thus, relocalization may be performed frequently. Therefore, the space is divided into small cells to set a position information acquisition mechanism, for example, a find-grained deep learning model.

The accuracy or precision of coarse-grained deep learning model may be lower than that of the fine-grained deep learning model. The computation power or computation time for applying the coarse-grained deep learning model may be smaller than that for applying the fine-grained deep learning model.

In this case, the set position information acquisition mechanism may use a complex model with a large amount of calculation. For example, the robot 100 or the cloud server 300 may reduce the size of the cell in the area where the position information is required to be precisely acquired, such that the relocalization may be performed by precisely identifying the position information.

Figure 13:
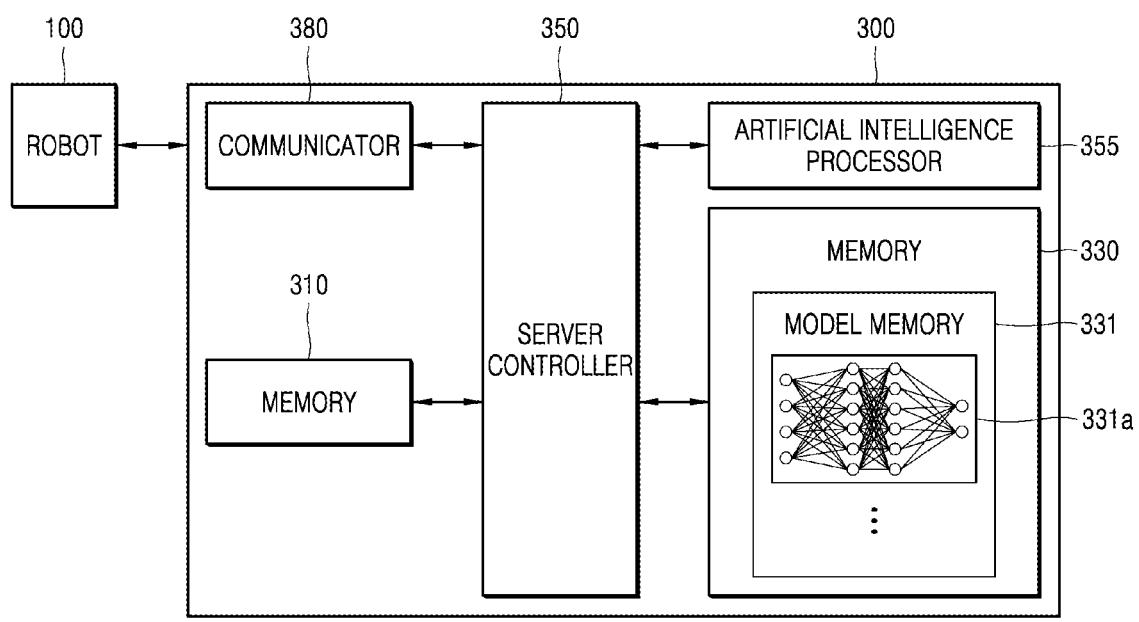
FIG. 13 is a block diagram showing example components of a computer server according to an embodiment of the present disclosure.

FIG. 13 is a block diagram showing example components of a cloud server 300 according to an embodiment of the present disclosure. The cloud server 300 in FIG. 13 may generate a map or a position information acquisition mechanism. In some embodiments, the cloud server 300 may be a kind of artificial intelligence server and may transmit and receive data to and from multiple robots 100.

A server controller 350 of cloud server 300 may generate position information by performing the position information acquisition mechanism based on cell information transmitted by a robot 100 or sensor data transmitted by the robot and may transmit the generated position information to the robot 100.

In one embodiment, a model memory 331 may include a position information acquisition mechanism 331a based on a deep learning. In one example, the server controller 350 may control the model memory 331 to perform the position information acquisition mechanism based on the deep learning.

In the other example, the server controller 350 may perform the position information acquisition mechanism that is not based on the deep learning.

The robot 100 and a cloud server 300 may collaborate on the operations described with reference to FIGS. 1 to 12. The collaborations are classified into a first category, a second category, a third category, and a fourth category as follows.

The first category is a category in which the robot 100 performs the cell information acquisition mechanism and the position information acquisition mechanism. In this case, the cloud server 300 performs data backup and synchronization. In an embodiment of the first category, the robot 100 may perform all operations required to perform the relocalization using an excellent computing power of the robot.

The second category is a category in which the robot 100 performs the cell information acquisition mechanism and the position information acquisition mechanism which is a light model that uses less amount of computing power. The cloud server 300 performs a position information acquisition mechanism that is a heavy model that uses a large amount of computing power. This is suitable when the robot 100 has a mid-high level of computing power. The robot 100 performs the position information acquisition mechanism with a less amount of calculation.

In some examples, the cloud server 300 performs the position information acquisition mechanism with larger amount of calculation to transmit the position information to the robot 100. The robot 100 transmits, to the cloud server 300, sensor data, for example, an image photographed by a camera sensor 230 and a LiDAR frame sensed by a LiDAR sensor 200.

The third category is a category in which the robot 100 performs the cell information acquisition mechanism and the cloud server 300 performs the position information acquisition mechanism. The configuration is suitable when the robot 100 has a mid-low level of computing power. The robot 100 only performs the cell information acquisition mechanism with less amount of calculation. The robot 100 transmits the sensor data to the cloud server 300 and receives the position information from the cloud server 300 to complete the relocalization.

The fourth category is a category in which the robot 100 transmits, to the cloud server 300, GPS coordinate information, communication-related information, or the sensor data. The cloud server 300 performs the cell information acquisition mechanism and the position information acquisition mechanism. The configuration is suitable when the robot 100 has a low level of computing power. The operations performed by the controller 250 of the robot may be performed by the server controller 350.

When the embodiments are applied, the robot 100 or the cloud server 300 may acquire the position information (e.g., the cell information) with a low precision through GPS, Wi-Fi, and a mobile communication network (e.g., a cellular network), and then may acquire the precise position information suitable for the cell.

An outdoor robot that may cover a large space may inefficiently generate the position information related to an entire area using one map or the position information acquisition mechanism. That is, the robot may search the entire map to perform the relocalization, thereby increasing the computing power to calculate the position of the robot.

In the case where the large space is divided into cells as shown in FIGS. 1 to 3, the robot determines which cell defines the position of the robot, searches only a map related to the cell, or performs the position information acquisition mechanism related to the cell, thereby increasing the search speed.

In particular, when deep-learning based and visual-based relocalization is implemented with the position information acquisition mechanism, relatively fine grained localization may be performed. In the case where a single deep learning model is used for a large region, a large number of 360-degree images covering the entire region are provided, which may lead to a degraded learning efficiency.

For example, a lot of images generated in the large space and the corresponding position information are learned using one deep learning model, thereby causing a complicated deep learning model. One deep learning model is used for the large area, thereby increasing learning time and a time to taken to perform the localization and degrading the precision thereof.

Different optimal mechanisms required to perform the relocalization may be used for sub-areas of a broadband space.

The robot 100 or the cloud server 300 divides the space into areas having various types of shapes such as a grid, a circle, and a polygon. The small divided area is referred to as "a cell". The robot 100 or the cloud server 300 sets a position information acquisition mechanism which is a relocalization model/methodology optimized for the cell.

Subsequently, the robot 100 or the cloud server 300 may use cell information acquisition mechanism and acquire the cell information which is relatively coarse-grained position information. After acquiring the cell information, the robot 100 or the cloud server 300 may correct the position of the robot 100 by using the fire-grained position information.

In the case where the space is divided into the cells, it is not required to use one complicated deep learning model for the large space. Therefore, the robot 100 or the cloud server 300 may quickly perform the localization through the position information acquisition mechanism such as a simpler deep learning model combined with the selected cell information.

In the case where changes occur, for example, the object is moved or relocated or new buildings are built in the cell, the robot 100 or the cloud server 300 may update only the position information acquisition mechanism corresponding to the cell.

In some examples, the robot 100 or the cloud server 300 may update the position information acquisition mechanism when a pose value predicted by the robot during the relocalization is different from a result value obtained through the position information acquisition mechanism.

The difference may occur when the position information generated using the position information acquisition mechanism is not accurate, which signifies changes in the features of the external space. Therefore, as the robot 100 or the cloud server 300 requires the updated position information acquisition mechanism reflecting the changes, the robot 100 or the cloud server 300 may perform the update operation.

In the case where the spaces corresponding to the divided cells have different features, the different position information acquisition mechanisms may be used for each cell. For example, the cell corresponding to the city center where a lot of objects are located may be stored in a map including high-resolution images or precise 360-degree LiDAR frames.

The cell corresponding to an open ground where the objects are not located may be stored with a low-resolution or in a simple map. In this configuration, the robot 100 or the cloud server 300 may use heterogeneous position information acquisition mechanisms according to features of cells. For example, the robot 100 or the cloud server 300 may use heterogeneous deep learning models or heterogeneous feature-based/laser-based methodologies.

In the case where one robot 100 moves in different areas (e.g., different cells) in different time zones, the cell may be designated and the model or the methodology may be changed to a new one. For example, it is assumed that the robot 100 moves in a first area at a first time point and then the same robot moves in a second area at a second time point. The robot 100 performs the relocalization in the first area using the first position information acquisition mechanism for the first area. In the case where the robot 100 moves to the second region, the robot 100 performs the relocalization in the second region using the second position information acquisition mechanism used for the second area.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is determined as an algorithm that improves the performance of a task through consistent experiences with the task.

An artificial neural network (ANN) is a model used in machine learning and may refer to any kind of model having a problem-solving capability, the model including artificial neurons (nodes) forming a network by a combination of synapses. The ANN may be determined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, and the like. In some examples, hyper-parameters refer to parameters to be set before learning in a machine learning algorithm and includes a learning rate, the number of repetitions, a minimum placement size, an initialization function, and the like.

The training purpose of the ANN may be regarded as determining model parameters to minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent determined in any embodiment to select an action or a sequence of actions that maximizes cumulative reward in each state.

Machine learning implemented using a deep neural network (DNN) including a plurality of hidden layers in the ANN is called deep learning, and the deep learning is a portion of the machine learning. In the following description, the machine learning includes the deep learning.

For the robot 100, the artificial intelligence processor 255, which is a sub-component of the controller 250 that has been described above, may perform an artificial intelligence function. The artificial intelligence processor 255 of the controller 250 may be implemented with software or hardware.

In this case, the communicator 280 of the robot 100 may transmit or receive data to or from external apparatuses such as the cloud server 300, which is described in FIG. 13, or a robot that performs another artificial intelligence function through wired and wireless communication technologies. For example, the communicator 280 may transmit or receive sensor information, user inputs, learning models, controls signals, and the like to or from external apparatuses.

In this case, the communication technology used by the communicator 280 includes global system for mobile communication (GSM), code-division multiple access (CDMA), long term evolution (LTE), 5G, Wireless LAN (WLAN), Wireless-Fidelity (Wi-Fi), Bluetooth, radio-frequency identification (RFID), infrared data association (IrDA), ZigBee, near field communication (NFC), and the like.

The interface 290 may acquire various kinds of data. In this case, the interface 290 may include a camera that receives an image signal input, a microphone that receives an audio signal, a user input that receives information from a user, and the like. Information acquired by the LiDAR sensor 220, the camera sensor 230, or the microphone refers to sensing data, sensor information, and the like.

The interface 290, various types of sensors, the wheel encoder of the mover 190, and the like may acquire input data or the like to be used when an output is acquired using a learning model and learning data for learning a model. The aforementioned components may acquire raw input data. In this case, the controller 250 or the artificial intelligence processor 255 may extract an input feature as a preprocessing process for the input data.

The artificial intelligence processor 255 may train a model including an ANN using learning data. The trained ANN may be called a learning model. The learning model may be used to infer a result value not for the learning data but for new input data, and the inferred value may be used as a determination basis for the robot 100 to perform a certain operation.

In this case, the artificial intelligence processor 255 of the robot 100 may perform artificial intelligence processing along with the artificial intelligence processor 355 of the cloud server 300.

In this case, the artificial intelligence processor 255 of the robot 100 may include a memory integrated or implemented within the robot 100. Alternatively, the artificial intelligence processor 255 of the robot 100 may be implemented with an additional memory, an external memory coupled to the robot 100, or a memory of an external apparatus.

The robot 100 may acquire at least one of internal information related to the robot 100, environmental information related to the robot 100, and user information using various types of sensors.

A memory built in the robot 100 may store data to support various types of functions of the robot 100. For example, the memory may store input data, learning data, a learning model, a learning history, and the like which are acquired by the interface 290 or various types of sensors built in the robot 100.

The controller 250 may determine at least one executable operation of the robot 100 based on information determined or generated using a data analysis algorithm or a machine learning algorithm. In some examples, the controller 250 may control components of the robot 100 to perform the determined operation.

To this end, the controller 250 may request, retrieve, receive, or utilize data of the artificial intelligence or the memory and may control the components of the robot 100 to execute a predicted operation or an operation determined as being desirable among the at least one executable operation.

In this case, when there is a need for connection to an external apparatus in order to perform the determined operation, the controller 250 may generate a control signal for controlling the external apparatus and transmit the generated control signal to the external apparatus.

The controller 250 may acquire intention information with respect to a user input and may determine user's requirements based on the acquired intention information.

In some examples, the controller 250 may extract a feature point from sensor data acquired in real time, such as image sensor data or LiDAR sensor data. To this end, the artificial intelligence processor 255, i.e., more specifically, a FEM submodule may include an ANN that is trained according to the machine learning algorithm. In some examples, the artificial intelligence processor 255 of the robot 100 may be trained by the artificial intelligence processor 355 of the cloud server 300 or through distributed processing therebetween.

The controller 250 may collect history information including operations of the robot 100, user feedback regarding the operations, and the like and may store the history information in the memory or the artificial intelligence processor 255 or transmit the history information to an external apparatus such as the cloud server 300. The collected history information may be used to update the learning model.

FIG. 13 is a block diagram showing example of components of a cloud server according to an embodiment of the present disclosure.

A cloud server 300 that performs a function of an artificial intelligence server, i.e., an AI server may refer to an apparatus that trains an ANN using a machine learning algorithm or an apparatus that uses a trained ANN. The cloud server 300 may include a plurality of servers to perform distributed processing and may be determined as a 5G network.

The cloud server 300 includes a communicator 380, a server controller 350, an artificial intelligence processor 355, and the like, each of which may be the same as, or similar to, the corresponding components described above with reference to FIG. 4. In some examples, the cloud server 300 may further include one or memories 310, 330. With reference to FIG. 13, memory 330 may include a model memory 331. The model memory 331 may store a model (or an artificial intelligence network 331a) that is already trained or being trained by the artificial intelligence processor 355.

The artificial intelligence processor 355 may train the ANN 331a based on learning data. The learning model may be used while being provided in the cloud server 300 of the ANN or while provided in an external apparatus such as the robot 100.

The learning model may be implemented with hardware, software, or a combination thereof. When some or all of the learning model is implemented with software, one or more instructions to form the learning model may be stored in the memory 330.

The server controller 350 may infer a result value for new input data using the learning model and may generate a response or a control command based on the inferred result value.

AI technology can be used for the robot 100, and the robot 100 can include a guide robot, a transport robot, a cleaning robot, a wearable robot, an entertainment robot, a pet robot, an unmanned flying robot, and the like.

The robot 100 can include a robot controller that controls operation, and the robot controller can refer to software or a chip implemented as hardware.

The robot 100 obtains state information related to the robot 100 based on sensor information obtained from various types of sensors or detects (or recognizes) the surrounding environment and an object or generates map data, or determines a moving route and travel plans of the robot, or determines response to user interaction, or determines operation of the robot.

The robot 100 can use sensor information acquired from at least one sensor among a LiDAR, a radar, and a camera to determine a movement route and travel plans of the robot 100.

The robot 100 can perform the above operations using a learning model including at least one ANN. For example, the robot 100 can recognize a surrounding environment and an object using a learning model and can determine operation of the robot 100 based on the recognized surrounding environment information or object information. The learning model can be directly learned by the robot 100 or can be learned by an external device such as the AI server 200.

In this situation, the robot 100 can perform operation of the robot 100 by generating a result using a direct learning model and can also perform the operation of the robot 100 by transmitting sensor information to the external device such as the AI server or cloud server 300 and receiving the generated result thereof.

The robot 100 determines a moving route and travel plans of the robot 100 based on at least one of map data, object information detected from sensor information, or object information obtained from an external device, and controls the driver to determine the moving route and the travel plans of the robot 100 to travel the robot 100.

The map data can include object identification information on various types of objects disposed in the space where the robot 100 moves. For example, the map data can include object identification information related to fixed objects such as walls and doors and movable objects such as flower pots and desks. The object identification information can include a name, a type, a distance, a position, and the like.

In some examples, the robot 100 can control the driver based on the control/interaction of the user, to thereby perform operation or travelling of the robot 100. In this situation, the robot 100 can obtain intention information related to the interaction determined based on the user's operation or voice utterance, and determine the response based on the obtained intention information to perform the operation of the robot 100.

In some examples, the robot 100 performs autonomous driving, and in this process, the AI technology is applied, and can include a mobile robot, a vehicle, an unmanned flight vehicle, and the like.

The autonomous robot 100 can include an autonomous driving control portion that controls a function for the autonomous driving, and the autonomous control portion can refer to software or a chip implemented as hardware. The autonomous driving controller can be included in the robot 100 as a component of the autonomous robot 100 and the autonomous driving controller is provided as additional hardware outside of the robot 100 to be connected thereto.

The autonomous robot 100 can obtain state information related to the autonomous robot 100 based on sensor information obtained from various types of sensor or can detect (or recognize) the surrounding environment and an object or can generate map data or can determine a travel route and travel plans of the robot 100, or can determine operation of the robot 100.

The autonomous robot 100 can use sensor information obtained from at least one sensor among a LiDAR, a radar, and a camera (in a manner similar to that described previously) in order to determine the movement route and travel plans of the robot 100.

In particular, the autonomous robot 100 can recognize the environment with respect to or the objects disposed in invisible areas or areas having a predetermined distance or more by receiving the sensor information from the external devices or can receive information directly recognized by the external devices.

The autonomous robot 100 can perform the above operations using a learning model including at least one ANN. For example, the autonomous robot 100 can recognize a surrounding environment and an object using a learning model and can determine a driving line of the robot based on the recognized surrounding environment information or object information. The learning model can be learned directly by the autonomous vehicle 100 or can be learned by an external device such as an AI server (and/or remote server 300).

In this situation, the autonomous robot 100 can perform operation by generating a result using a direct learning model and can also transmit sensor information to the AI server 700 and can receive the generated result from the AI server to perform the operation of the robot 100.

The autonomous robot 100 determines a movement route and travel plans of the autonomous robot 100 based on at least one of map data, object information detected from sensor information, or object information obtained from an external device, and controls the driver to travel the autonomous travelling robot 100 along the determined movement route and according to travelling plans of the robot 100.

The map data can include object identification information related to various types of objects disposed in a space (e.g., a road) where the autonomous vehicle 100 travels. For example, the map data can include object identification information related to fixed objects such as street lights, rocks, buildings, and movable objects such as vehicles and pedestrians. The object identification information can include a name, type, a distance, a location, and the like.

In some examples, the autonomous robot 100 can control the driver based on control/interaction of the user to perform operation of the robot 100 or travel. In this situation, the autonomous robot 100 can obtain the intention information related to the interaction based on operation of the user or voice utterance, and determine the response based on the obtained intention information to perform the operation thereof.

In some examples, the robot 100 can use the AI technology and autonomous driving technology, and can include guide robots, transport robots, cleaning robots, wearable robots, entertainment robots, pet robots, unmanned flying robots, and the like.

The robot 100 that performs a function for autonomous driving can be collectively referred to as a device that moves along a given moving line of the robot 100 without control of the user or moves by determining the moving line of the robot 100 by itself.

The robot 100 that performs a function for autonomous driving can use a common sensing method to determine at least one of a moving route or travelling plans of the robot 100. For example, the robot 100 that performs the autonomous driving function can determine at least one moving route or travelling plans of the robot 100 based on the information sensed by a LiDAR, a radar, and a camera.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The memory medium of the computer program may include a memory medium including a semiconductor recording element, an optical recording medium, a magnetic recording medium. Further, the computer program that implements the embodiment of the present disclosure may include a program that is transmitted in real time through an external apparatus.

While the present disclosure has been mainly described referring to the exemplary embodiments of the present disclosure hereinabove, various modifications and changes can be made at the level of those skilled in the art. Therefore, unless such modifications and changes do not deviate from the range of the present disclosure, it will be understood that they are included in the scope of the present disclosure.

Other embodiments are within the scope of the following claims.

What is claimed is:

1. A robot, comprising:
    a sensor configured to acquire data related to an operating space that the robot is configured to operate in, wherein the operating space is subdivided into a plurality of cells;
    a memory configured to store two or more pieces of information regarding at least two cells of the plurality of cells, and a position information acquisition technique indicator for at least one cell of the at least two cells, wherein the position information acquisition technique indicator is indicative of a position information acquisition technique used to generate position information of the robot in the at least one cell; and
    a controller configured to acquire cell information related to a cell of the plurality of cells that the robot is positioned in, and generate the position information of the robot based on the position information acquisition technique, the data acquired by the sensor, and the acquired cell information.

2. The robot of claim 1, wherein the controller is configured to acquire the cell information based on at least one of global positioning system (GPS) coordinate information, identification information of a wireless network, identification information of a mobile communication network, information acquired by the sensor, or external map information.

3. The robot of claim 2, wherein the controller is configured to:
    define a GPS coordinate deviation range, and
    determine at least one cell overlapping within the GPS coordinate deviation range.

4. The robot of claim 2, wherein the controller is configured to:
    acquire the cell information based on the identification information of the wireless network or the identification information of the mobile communication network; and
    acquire at least one piece of cell information based on an intensity or a coverage of a signal of the wireless network or the mobile communication network during the acquisition of the cell information.

5. The robot of claim 2,
    wherein the sensor is a camera sensor,
    wherein the memory is configured to store the cell information related to at least one landmark,
    wherein the controller is configured to acquire a first landmark based on an image acquired by the camera sensor, and
    wherein the controller is configured to generate the cell information based on a comparison between the first landmark with the at least one landmark.

6. The robot of claim 1,
    wherein the sensor is a camera sensor configured to generate an image, and
    wherein the position information acquisition technique is used to generate the position information based on the generated image and a deep learning model.

7. The robot of claim 1,
    wherein the sensor comprises a camera sensor configured to generate an image,
    wherein the memory is configured to store information related to a plurality of images related to one or more cells of the plurality of cells, and
    wherein the position information acquisition technique is configured to generate the position information by comparing information related to the image generated by the sensor with information related to the plurality of images stored in the memory.

8. The robot of claim 1,
    wherein, the cell information comprises two or more pieces of cell information within a deviation range, and
    wherein the controller is configured to select one of the two or more pieces of cell information within the deviation range based on previously obtained cell information.

9. The robot of claim 1, wherein the controller is configured to perform relocalization to restore a position of the robot based on the generated position information.

10. A computer server configured to generate position information of a robot in an operating space, the computer server comprising:

a communicator configured to transmit and receive data to and from at least one robot operating in the operating space, wherein the operating space is subdivided into a plurality of cells;

a memory configured to store two or more pieces of information regarding at least two cells of the plurality of cells, and a position information acquisition technique indicator of at least one cell of the at least two cells, wherein the position information acquisition technique indicator is indicative of a position information acquisition technique used to generate position information of the at least one robot in the at least one cell; and a server controller configured to acquire cell information related to a cell of the plurality of cells that the at least one robot is positioned in, and generate the position information of the at least one robot in the operating space based on the position information acquisition technique, the data received from the at least one robot, and the acquired cell information.

11. The computer server of claim 10,
wherein the data received by the communicator includes at least one of global positioning system (GPS) coordinate information, a wireless network identification information, a mobile communication network identification information, or sensor acquired information, and
wherein the server controller is configured to generate the position information based on the information received by the communicator.

12. The computer server of claim 11,
wherein the server controller is configured to define a GPS coordinate deviation range and
wherein the server controller is configured to generate at least one piece of cell information overlapping within the GPS coordinate deviation range.

13. The computer server of claim 11,
wherein the server controller is configured to acquire cell information based on the identification information of the wireless network or the identification information of the mobile communication network, and
wherein the server controller is configured to acquire at least one piece of cell information based on an intensity or coverage of a signal of the wireless network or the mobile communication network during the acquisition of the cell information.

14. The computer server of claim 11,
wherein the memory is configured to store the cell information related to at least one landmark,
wherein the server controller is configured to acquire a first landmark from an image received from the robot, and
wherein the server controller is configured to generate the cell information based on a comparison between the first landmark and the at least one landmark.

15. The computer server of claim 10,
wherein, the cell information comprises two or more pieces of cell information within a deviation range, and wherein the server controller is configured to select one of the two or more pieces of cell information within the range based on previously acquired cell information.

16. A method of generating position information of a robot in an operating space subdivided into a plurality of cells, comprising:
storing, in a memory device, two or more pieces of information regarding at least two cells of the plurality of cells, and position information acquisition technique indicator of at least one cell of the at least two cells, wherein the position information acquisition technique indicator is indicative of a position information acquisition technique used to generate position information of the robot in the at least one cell;
acquiring, using a sensor of the robot, sensor data related to the operating space;
acquiring, by a controller, cell information related to a cell of the plurality of cells that the robot is positioned in; and
generating position information of the robot based on the position information acquisition technique, the acquired sensor data, and the acquired cell information.

17. The method of claim 16, further comprising:
defining, by the controller, a GPS coordinate deviation range; and
generating, by the controller, at least one piece of cell information overlapping within the GPS coordinate deviation range.

18. The method of claim 16, wherein acquiring cell information includes acquiring the cell information based on an intensity or coverage of a signal of a wireless network or a mobile communication network during the acquisition of the cell information.

19. The method of claim 16, wherein acquiring sensor data includes acquiring data from a camera sensor of the robot, and the method further comprises:
storing, in the memory device, information related to at least one landmark;
acquiring an image of a first landmark using the camera sensor; and
generating the cell information based on a comparison between the first landmark and the landmark stored in the memory.

20. The method of claim 16, wherein, the cell information comprises two or more pieces of cell information within a deviation range, and wherein the controller is configured to select one of the two or more pieces of cell information within the deviation range based on previously obtained cell information.

* * * * *